(12) United States Patent
Lehwalder

(10) Patent No.: US 10,159,892 B2
(45) Date of Patent: Dec. 25, 2018

(54) APPARATUS, SYSTEM AND METHOD FOR MATCH-3 STRATEGIC ADVENTURE

(71) Applicant: Dean Lehwalder, Salt Lake City, UT (US)

(72) Inventor: Dean Lehwalder, Salt Lake City, UT (US)

( * ) Notice: Subject to any disclaimer, the term of this patent is extended or adjusted under 35 U.S.C. 154(b) by 341 days.

(21) Appl. No.: 15/266,748

(22) Filed: Sep. 15, 2016

(65) Prior Publication Data

US 2017/0072297 A1    Mar. 16, 2017

Related U.S. Application Data

(60) Provisional application No. 62/219,461, filed on Sep. 16, 2015.

(51) Int. Cl.
*A63F 13/00* (2014.01)
*A63F 3/00* (2006.01)
*A63F 3/02* (2006.01)

(52) U.S. Cl.
CPC ............ *A63F 3/00094* (2013.01); *A63F 3/02* (2013.01); *A63F 13/00* (2013.01); *A63F 2003/00463* (2013.01); *A63F 2003/00996* (2013.01)

(58) Field of Classification Search
None
See application file for complete search history.

(56) References Cited

U.S. PATENT DOCUMENTS

| | | | | |
|---|---|---|---|---|
| 6,354,939 B1* | 3/2002 | Morita | ................... | A63F 13/10 345/581 |
| 2014/0295964 A1* | 10/2014 | Takeuchi | ............... | A63F 13/335 463/31 |
| 2014/0302935 A1* | 10/2014 | Royce | ................... | A63F 13/822 463/42 |
| 2015/0231499 A1* | 8/2015 | Mizukami | ........... | A63F 13/5378 463/31 |
| 2016/0129349 A1* | 5/2016 | Zhao | ..................... | A63F 13/537 463/31 |
| 2017/0209785 A1* | 7/2017 | Park | ....................... | A63F 9/0612 |

* cited by examiner

*Primary Examiner* — Robert T Clarke, Jr.
(74) *Attorney, Agent, or Firm* — Phillips, Ryther & Winchester; Justin K. Flanagan

(57) ABSTRACT

The present disclosure provides systems and methods for a board game or an electronic version of the same, including a match-3 component and a strategy game piece component. The game may be implemented as a physical board game or as a computer-executed application. Matches of three or more tokens or icons result in an effect that is applied to game pieces of the player who made the match and/or an opponent of the player who made the match. The effect on game pieces resulting from a match are limited to game pieces positioned within the rows and/or columns that correspond to the rows and/or columns within which the matched tokens or icons are positioned.

15 Claims, 26 Drawing Sheets

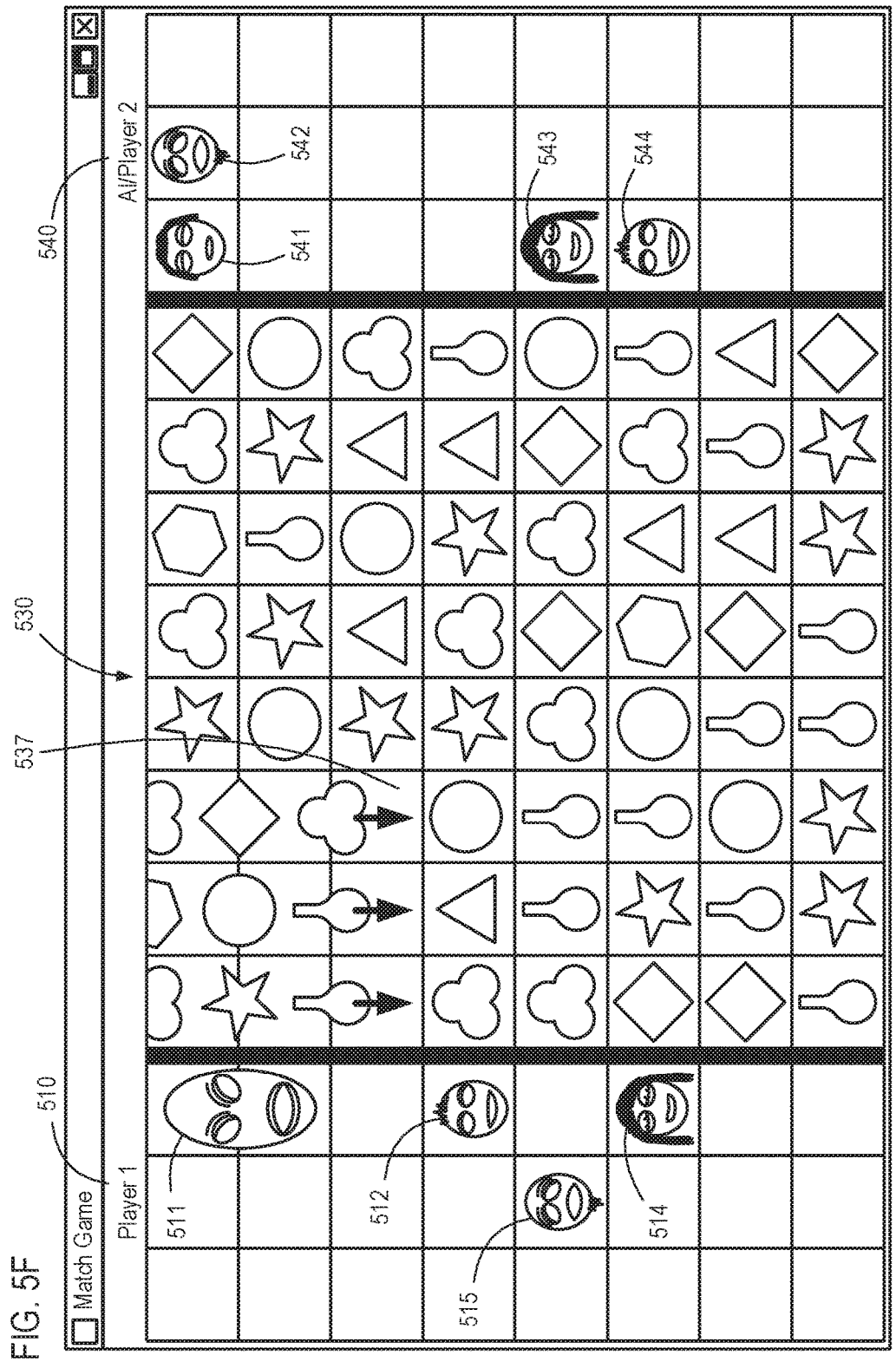

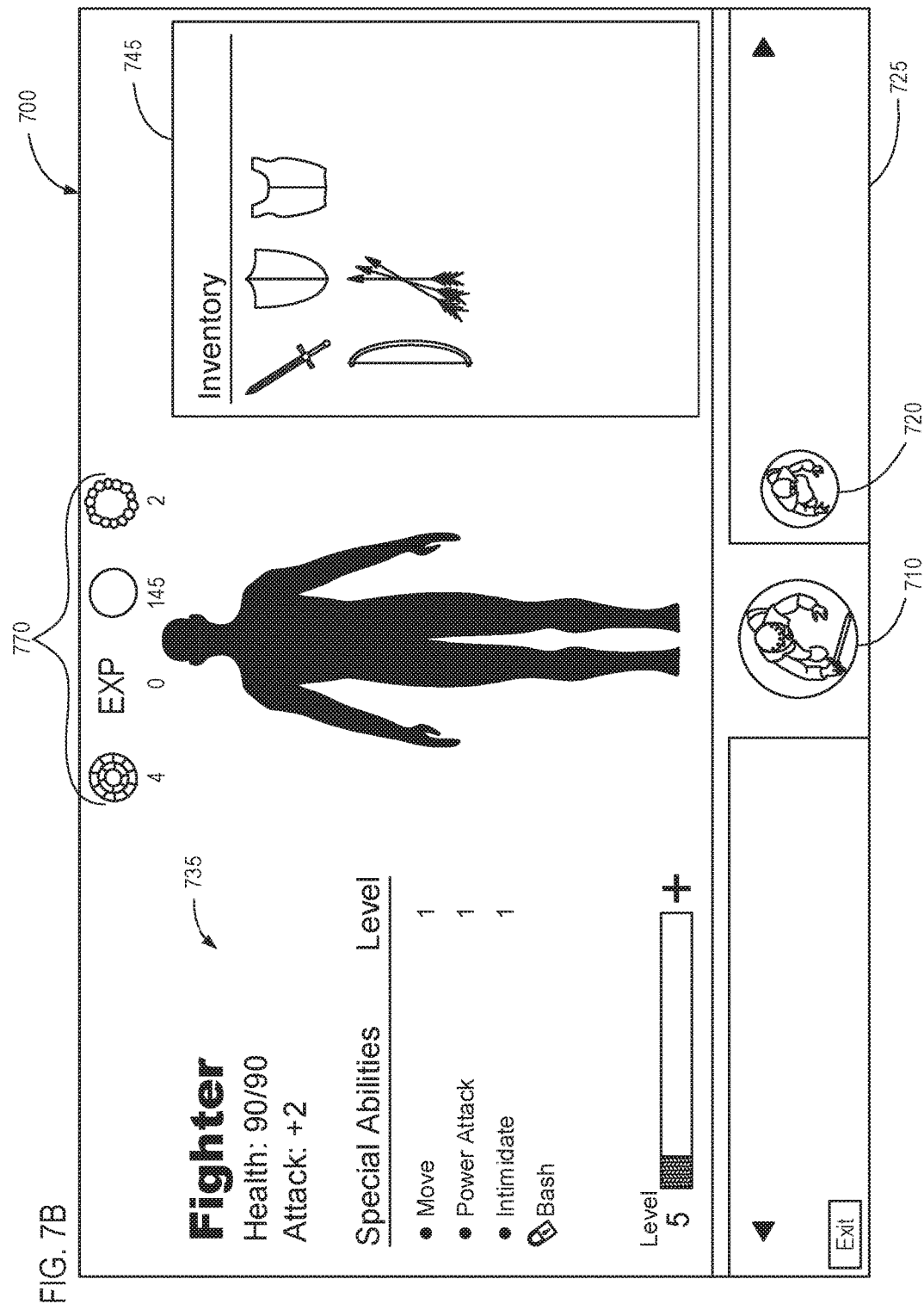

APPARATUS, SYSTEM AND METHOD FOR MATCH-3 STRATEGIC ADVENTURE

TECHNICAL FIELD

This disclosure includes a description of an apparatus, systems, and methods for a match-3 game that includes a strategic adventure component. Specifically, matches from the match-3 field affect game pieces in corresponding rows (and/or optionally columns) in associated game-piece fields. A physical implementation as well as a virtual implementation are contemplated and described.

BRIEF DESCRIPTION OF THE DRAWINGS

Non-limiting and non-exhaustive embodiments of the disclosure are described herein, including various embodiments of the disclosure illustrated in the figures listed below.

FIG. 5F illustrates the three matched diamonds disappearing and the icons above cascading down.

FIG. 7B illustrates the character view after a player has upgraded or refilled various attributes, according to various embodiments.

DETAILED DESCRIPTION

Figure 1A:
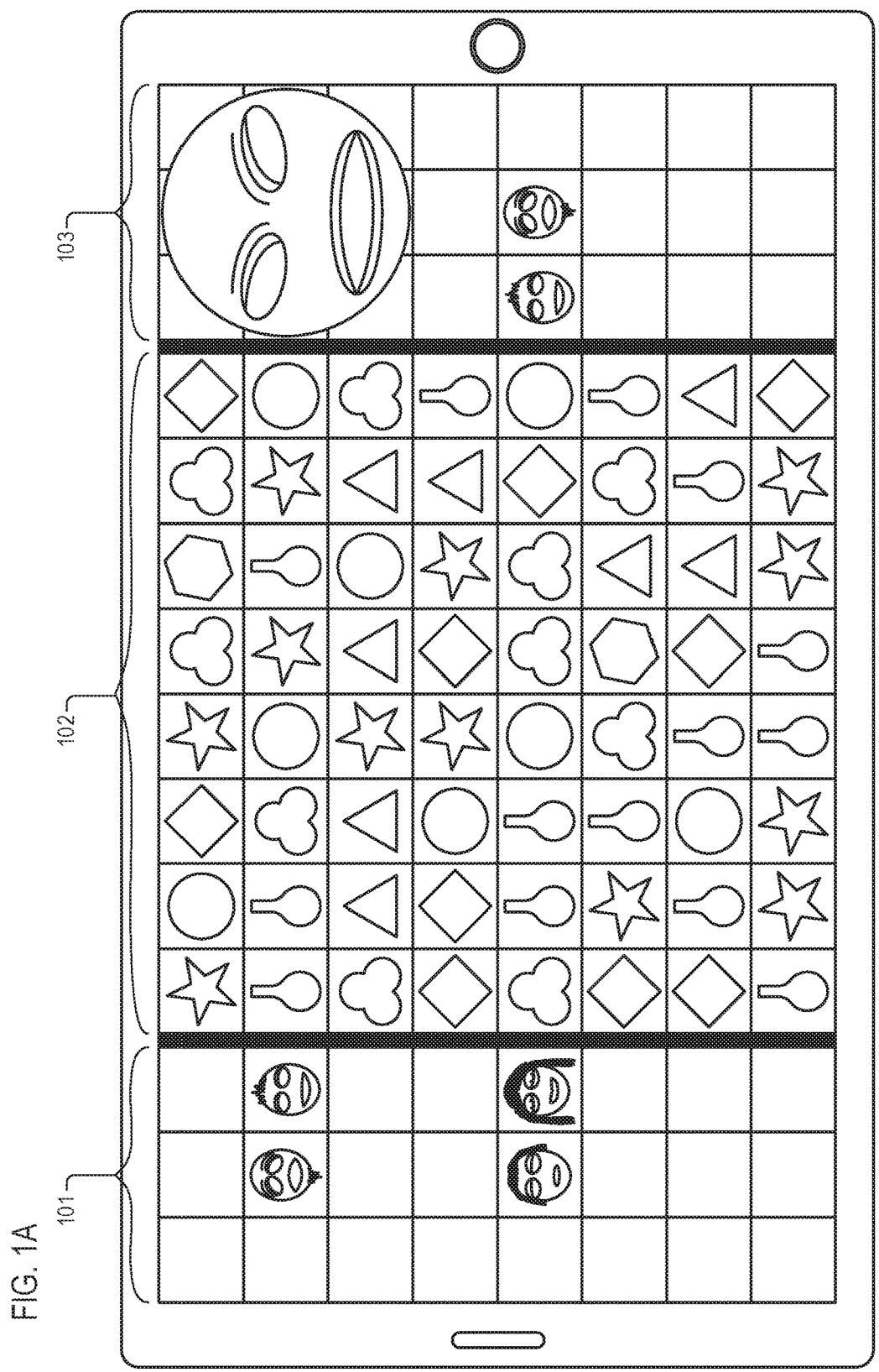
FIG. 1A is a representation of one embodiment of a layout for a two-player version of the match-3 strategic adventure game.

The presently described systems and methods relate to a game for entertainment including a match-3 component and a strategy game-piece component. The game disclosed herein can be played on one or more physical game boards with physical regions for the game-piece fields and the match-3 field and physical pieces for the game pieces and the match-3 icons. Thus, the term "icon" used for digital examples may be replaced with "tokens" for physical adaptations. Match-3 fields and game-piece fields illustrated and described herein are generally rectangular (e.g., a rectangular or square); however, variations of this shape are possible and contemplated. For example, a rectangular field may include a parallelogram or be replaced with a n-side field, where n is an integer, or included rounded or other curved edges. The cells of a field may also be circular, oval, square, rectangular, or any other shape. The array of icons may also be adapted to be non-rectangular in some embodiments. In still other embodiments, cells may be replaced with a free-movement area within which icons may be arranged in any layout or form, which may or may not include rows and columns.

The game may be played via an application on any of a wide variety of devices, including mobile phones, tablets, computers, laptops, a hybrid of the same, gaming consoles, entertainment consoles, infotainment devices, televisions, and/or any other device configured or capable of being connected to a display device and receiving inputs from one or more users.

In various embodiments, a match-3 field may provide a region within which one or more players move or switch icons from one space to another in order to form matches of multiple icons in a row or column, or possibly along a diagonal. In some alternative embodiments of the game, matches may be formed by matching two or more icons along a row, column, or diagonal. In other embodiments of the game, three or more icons must be matched along a row or column. In still other alternative embodiments, matches may be defined as any of a wide variety of shapes. For example, a match may be identified as an "L" shape in which three icons are matched along a column and two of the same icons are matched along a row, or vice versa. In various embodiments, wildcard icons may be configured to form matches with any icon. For example, a wildcard icon may be populated when a user matches four or more icons in a row or column. In some embodiments, wildcard icons can be used only once to form a match; in other embodiments, a wildcard icon may serve simultaneously as more than one type of icon. A wildcard icon may be earned or otherwise put into play for use by one or more players as a result of a player making a certain number of matches, types of matches, duration of play, and/or other game play accomplishments or combinations thereof.

Icons may be matched by shape, color, size, haptic characteristic, or any combination thereof. For example, a match may consist of aligning three diamond shaped icons of varying color. Alternatively, a match may consist of three heart shaped icons which are all the same color. Also, a match may consist of icons of dissimilar shape but comprised of the same color. As additional examples: the icons may all be the same shape (e.g., circles, diamonds, squares, etc.) and matches are made based on color; the icons may be varying shapes and colors and matches may be made based on either matched shapes or matched colors; the icons may be varying shapes and colors and matches may be made based on only one of matched shapes or matched colors; the icons may be different sizes and matches are made by matching icons having the same size; the icons may be different sizes and the matches may be made by combining three (or more) different sizes; and/or the icons may each be associated with a specific haptic feedback characteristic (e.g., a short pulse, long pulse, soft buzz, hard buzz, etc.) and matched accordingly.

In some embodiments, a color-blind person may select an icon shape mode in which matches are made based on shape instead of a color-based mode in which icon shapes are matched based on color. A settings module may change the matching mode based on a desired level of difficulty or difficulty level as the game progresses.

Various embodiments of the systems and methods described herein may include an effects module which determines what, if any, effect a match has on corresponding rows, columns, and/or diagonals of the active and/or inactive player (where the active player is the player whose turn it is currently and the inactive player(s) are those who are waiting for their turn). In various embodiments, the effect on the active player and/or inactive player(s) may be based, at least partially, on the type, color, shape, or other characteristic of the icons used to form the match. Additionally, the effect may be based on the row or column (or optionally, a diagonal) in which the match was made. The effect may also be based, at least partially, on the game pieces in corresponding rows and/or columns of the active player's and/or inactive players' game-piece fields. In some embodiments, the effect(s) may also be based partially on a status, power-up, rank, difficulty setting, or other game state of the active player, the inactive player(s), and/or the game as a whole.

In some embodiments, the effect may be to "damage" or eliminate the game pieces of the other player(s) on rows or columns on corresponding to the rows or columns in which the match was made. The amount of damage may depend on various attributes of the game pieces themselves; the type, color, or other characteristic of the matched icons; the number of icons matched; and/or characteristics associated with the game pieces of the active (matching) player on rows or columns corresponding to the rows or columns in which the match was made.

In some embodiments, the effects may accumulate or grow progressively allowing for amplified or special damage to be done to the opponent's game pieces (or special benefits to be active player's own game pieces). Similarly, the game pieces may have special powers. In various embodiments, the effects may be cumulative or combined, such that a match made by a player may have the effect of damaging another player's icons while simultaneously benefiting the matching player.

Accordingly, players may on their turn (e.g., before, during, or after) move their game pieces with the game-piece field to strategic advantage (or, in some embodiments, at any time). For example, it may be strategically advantageous to move a game piece with a special blocking power in front of a more vulnerable game piece to avoid damage based on an opponent's anticipated match. Similarly, it may be advantageous to move one or more game pieces to obtain an effect of an anticipated match. As another example, it may be advantageous to move one or more game pieces to avoid any effect of an anticipated match.

Thus, one aspect of the presently described systems and methods for a game is the movement of one or more game pieces to modify (i.e., change, alter, amplify, decrease, store, dilute, block, etc.) an effect of an existing or anticipated match by the active player and/or an opponent of the active player. The strategic movement of one or more game pieces coupled with the match-3 gameplay makes for a unique and challenging gameplay that can provide competitive and/or entertaining gameplay.

A game-piece module may allow a user (and/or the artificial intelligent (AI) player in a one-player game) to select one or more game pieces for placement in the game-piece field. In various embodiments, the game pieces available may be based on rank, status, difficulty settings, and/or other characteristics of the game state; the active players; the inactive players; and/or other configuration settings. In some embodiments, a free version of the game may include a limited set of game pieces and a pay version of the game may include additional game pieces.

In some embodiments, one or more game pieces may be available for purchase. In some embodiments, game pieces may be earned through gameplay and/or through purchase. Accordingly, a purchase module may allow a user to purchase additional game pieces, game piece abilities, and the like from a virtual store. More specifically, the virtual store may allow a user purchase items using actual currency and/or virtual currency earned during gameplay.

The game pieces may be strategically placed and or moved during gameplay, or remain stationary. Game pieces may be set up by the user or automatically set up in a start-up configuration when gameplay begins. The game pieces may take up one or more locations within the game-piece field. The game-piece field may have a defined number of locations. The defined number of locations in the game-piece field may be variable based on game state, difficulty settings, purchases, upgrades, rank, amount of time played, etc.

In various embodiments, game pieces may be selected by a user during game play. For example, a user may select a warrior game piece and thereafter select a power attack from a list displaying the warriors available abilities. Additionally, the list of abilities a user may select may vary depending on the circumstances accompanying the user selection. Such as, the current experience level of the game piece, the number of times a certain shape or color icon has been matched, or the like. A game piece may be selected by physically touching the game piece during gameplay. Alternatively, a user may select a virtual game piece by touching the display of the user device in an area of the game-piece field associated with the location of the game piece.

In various embodiments, a one-player version of the game may be played in which one or more (possibly all) matches have a positive effect on the player's game pieces. The object may be to attain a certain score, status, rank, or the like and may or may not include a time limit. In other embodiments a one-player version of the game may be played in which one or more AI players perform (or indicate) the moves of the second player, or third, fourth, etc. players in games that include more than two players.

Gameplay, such as the movement of game pieces, the movement of match-3 icons, a match itself, an effect, and/or other gameplay actions, may be associated with one or more sounds. Gameplay may include one or more background music or sound effects that can be used to enhance the gameplay experience. A store module (or physical store in the case of a physical game board) may allow for the purchase of additional sounds, game pieces, matching rules, opponents, matching effects, gameplay options, and/or the like. An at least partially ridged board game may be wood, metal, plastic and may include at least one ridged surface. Folds, bends, and the like may be used to make it more portable. Board games, materials, composites, supports, foldable versions and the like are known in the art.

In various electronic versions, user information may be stored and/or utilized for online competitive gameplay. Action points may be accumulated during gameplay and, in some embodiments, may continue to accumulate in subsequent games. Action points may be associated with a particular user, a particular game board layout, and/or particular game pieces. An inventory module may keep track of the abilities, action points, available game pieces, settings, etc. of a specific user. In various embodiments, online gameplay is facilitated through one or more wired or wireless networks. Wide area network (WAN) multi-user gameplay may be facilitated through the use of the Internet. Multi-user gameplay may also be possible via local area networks (LAN) and communication methods, such as those made possible via Wi-Fi, Bluetooth, near-field communications, etc.

As previously described, the game described herein may be implemented as a physical game or as an electronic game, or a hybrid thereof. Electronic versions of the game may include a module for rendering one or more of the described features, advantages, components, systems, etc. within a graphical user interface (GUI). User inputs may be provided in any of a wide variety of formats, including, but not limited to, touchscreen inputs, joysticks, a mouse, a keyboard, eye movement tracking, head tracking, motion detection, stylus inputs, laser pointer inputs, combinations thereof, and/or any other input suitable for providing or indicating a gameplay action as described herein.

Throughout this disclosure, well-known structures, materials, or operations are not shown or described in detail to avoid obscuring aspects of this disclosure. For instance, while many of the features and functionalities of the gaming system are described in terms of user interaction through a GUI, in some embodiments, the interaction with the gaming system may be facilitated through one or more application programming interfaces (APIs). Moreover, the gameplay may be facilitated by remote storage of program code or local storage of program code. Distributed systems may be utilized for implementing and enabling the gameplay and/or for authorization and access control.

Embodiments and implementations of the gaming systems and methods described herein may include various steps, which may be embodied in machine-executable instructions to be executed by a computer system. A computer system may include one or more general-purpose or special-purpose computers (or other electronic devices). The computer system may include hardware components that include specific logic for performing the steps or may include a combination of hardware, software, and/or firmware.

Embodiments may be provided as a computer program product including a computer-readable medium, such as a non-transitory computer-readable medium, having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or combination thereof.

Suitable networks may include communications or networking software, such as the software available from Novell, Microsoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes one or more processors and/or memory; computer systems may also include various input devices and/or output devices. The processor may include a general-purpose device, such as an Intel®, AMD®, or other "off-the-shelf" microprocessor. The processor may include a special-purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, a tape drive, an optical drive, a magneto-optical drive, or other means to read a storage medium. A suitable storage medium includes a magnetic, an optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, Objective C, PHP, .Net, database languages, APIs, SDKs, Flash, HTML, Cocoa, development kits, assembly, firmware, microcode, Swift, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular abstract data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as general purpose computers, computer programming tools and techniques, computer networks and networking technologies, digital storage media, and authentication, access control, and other security tools and techniques provided by public keys, encryption, firewalls, and/or other means.

The embodiments of the disclosure are described below with reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. That is, this disclosure includes every combination and permutation of the various embodiments, advantages, features, and functionalities described herein, including permutations and combinations that are mutually exclusive inasmuch as they may be harmonized and/or used at discrete time intervals.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1A is a representation of one embodiment of a layout for a two-player version of the match-3 strategic adventure game. As illustrated, the layout may include a match-3 field 102 in which players move and/or switch icons from one location to another to form matches of three or more icons. The layout may include one or more game-piece fields 101 and 103 in which a first player, a second player, and/or an artificial intelligence (AI) player may strategically position game pieces. Icon matches within the match-3 field 102 may effect on the game pieces within one or both of the game-piece fields 101 and 103.

Any of the various embodiments, features, advantages, alternatives, etc. that are described above may be implemented in the embodiment illustrated in FIG. 1A. In the illustrated embodiment, player 1 may strategically position one or more game pieces within the game-piece field 101. In various embodiments, game pieces may be positioned in a default position. In some embodiments, the number of game pieces may be limited based on game rules, difficulty settings, purchase history, play history, timing, etc.

A second player and/or an artificial intelligence (AI) may strategically (or by default) position one or more game pieces within a second game-piece field 103. Some game pieces may only take up one position within the game-piece fields 101 and 103. Other game pieces may take up more than one position within the game-piece fields 101 and 103. Each player may be limited to the number of positions, game-piece types, game-piece powers, etc. that may be played.

Figure 1B:
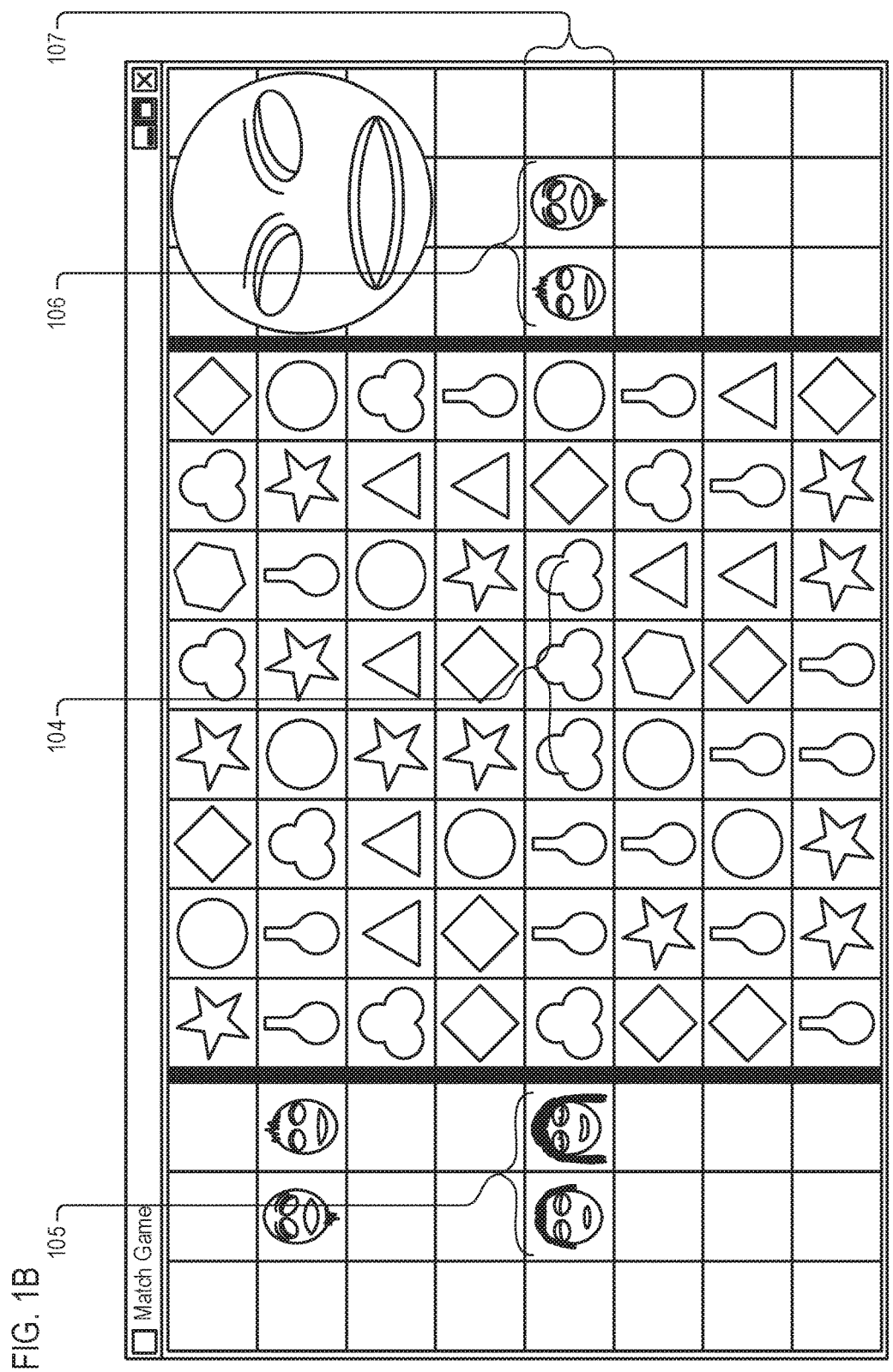
FIG. 1B is a representation of the embodiment of FIG. 1A in which a match of three icons has been made on the fifth row of the match-3 field.

FIG. 1B is a representation of the embodiment of FIG. 1A in which a match of three icons 104 has been made on the fifth row 107 of the match-3 field. The match may have an effect on game pieces within the row in the game-piece field corresponding to the row(s) in which the match was made. Thus, in the illustrated embodiment, the match in the fifth row 107 may affect the game pieces in the fifth row 107.

In some embodiments, based on the type of icons matched and/or based on the game pieces in the corresponding row(s) of the active (player who made the match) and/or inactive (opponent of the player who made the match) player, the match 104 may have a positive effect on the active player or a negative effect on the inactive player. That is, if player 1 made the match 104, then the match 104 may have a negative effect on one or more of player 2's game pieces 106. Alternatively and/or additionally, if player 1 made the match 104, then the match 104 may have a positive effect on or more of player 1's game pieces 105.

In some embodiments, the effects may be positive or negative and be applied to the active player and/or the inactive player(s). For example, a match may result in a positive effect to an opponent or another player. A player may make a match that results in damage to one or more of their own game pieces knowing that it will also damage their opponent (or other player's) game piece(s). For example, a "rage" match may have negative effects on all player's pieces and a "mass heal" match may heal one or more of the active player's game pieces along with one or more of other player's (s') pieces.

Figure 1C:
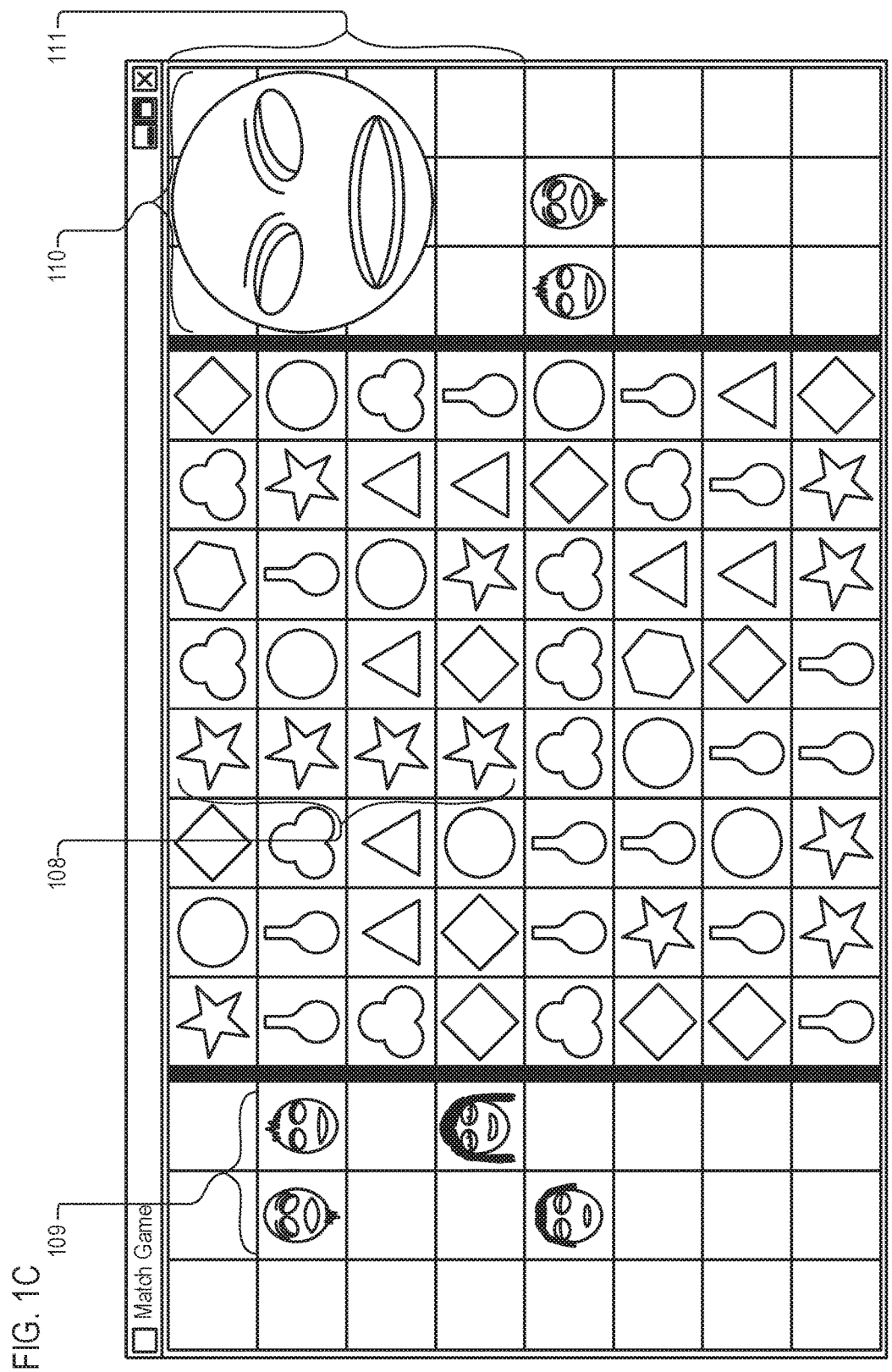
FIG. 1C is a representation of the embodiment of FIG. 1A in which a match of four icons has been made in the fourth column of the match-3 field.

FIG. 1C is a representation of the embodiment of FIG. 1A in which a match of four icons 108 has been made in the fourth column of the match-3 field. As in other embodiments, assuming the match was made by player 2, the match may have a positive effect on player 2's game piece 110. In some embodiments, game piece 110 may only be affected by a match if the match spans each of the three rows occupied by game piece 110. Thus, if a match of three were made across the first row, it may not (or alternatively may) have an effect on game piece 110. The match 108 may affect each of game pieces 109 in the second row. Because player 1 moved a game piece to the fourth row, the match 108 may affect the game piece in the fourth row of player 1's game-piece field.

Figure 2:
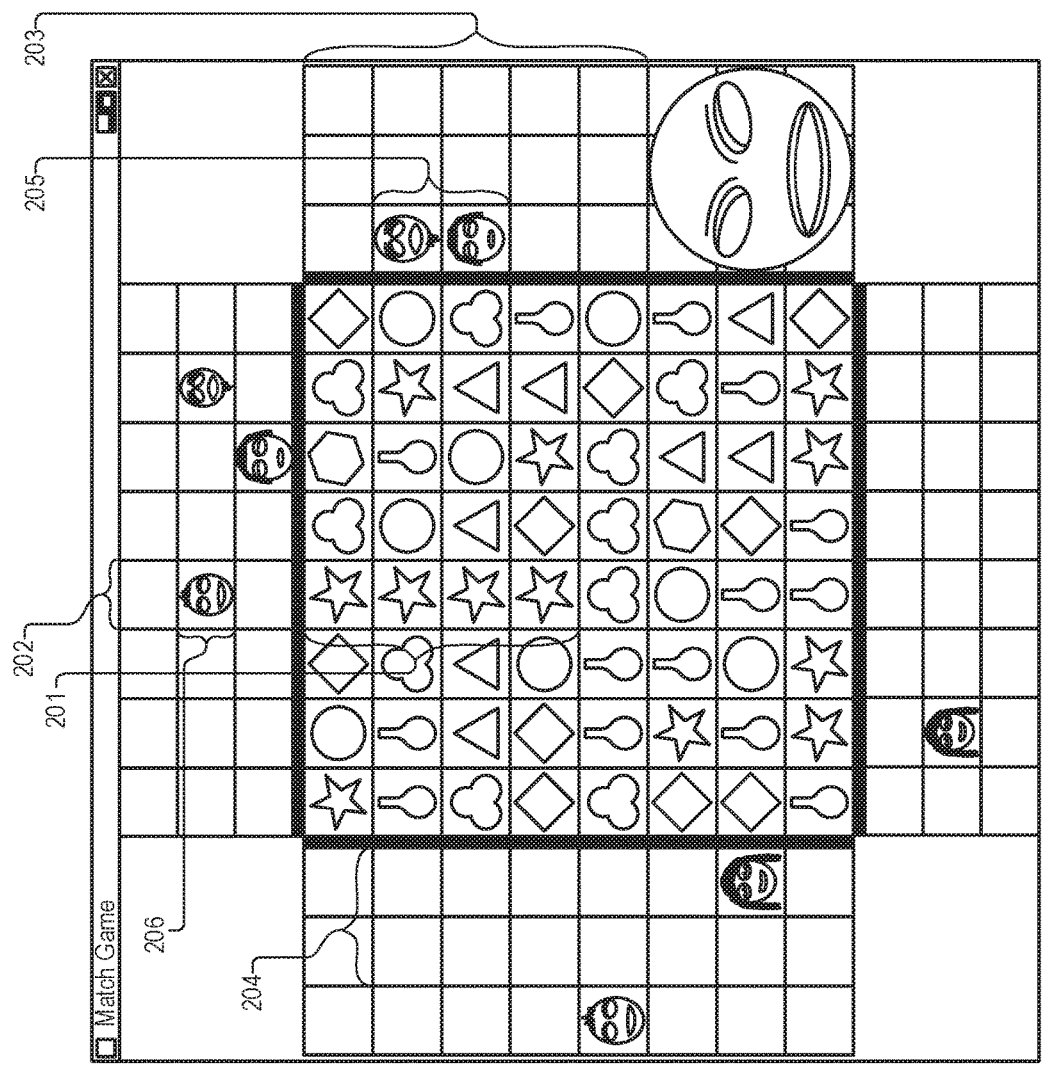
FIG. 2 is a representation of an embodiment of a layout for a four-player version of the match-3 strategic adventure game.

FIG. 2 is a representation of an embodiment of a layout for a four-player version of the match-3 strategic adventure game. The match-3 field may have a match 201 of four star icons in the fourth column. The match 201 may affect game pieces in the first four rows of player 1's game-piece field (there are none) 204, the game piece 206 in the fourth column of player 2's game-piece field 202, the two game pieces 205 in the first four rows of the game-piece field 203 of player 3, and/or the game pieces in the fourth column of player 4's game-piece field.

In various embodiments, the match 201 may only affect the active player if the match 201 will have a positive effect and only affect the inactive player if the match 201 will have a negative effect. In some embodiments, two or more of the players may be on a team and positive and negative effects may be applied to the active player's team and/or the inactive player's team based on whether the effect is positive or negative and which team made the match. The player's ability to utilize a game piece's feature may be based on the color or shape and the quantity of previously matched icons. For example, a player may be required to have matched a certain number of red icons to employ a special attack. Similarly, a game piece with the ability to heal other game pieces may not be able to use the ability without having matched a predetermined number of green icons. Additionally, icons of differing color or shape may contribute to a different attribute of the player's game pieces (e.g., health, attack, magic, movement, and the like).

Figure 3:
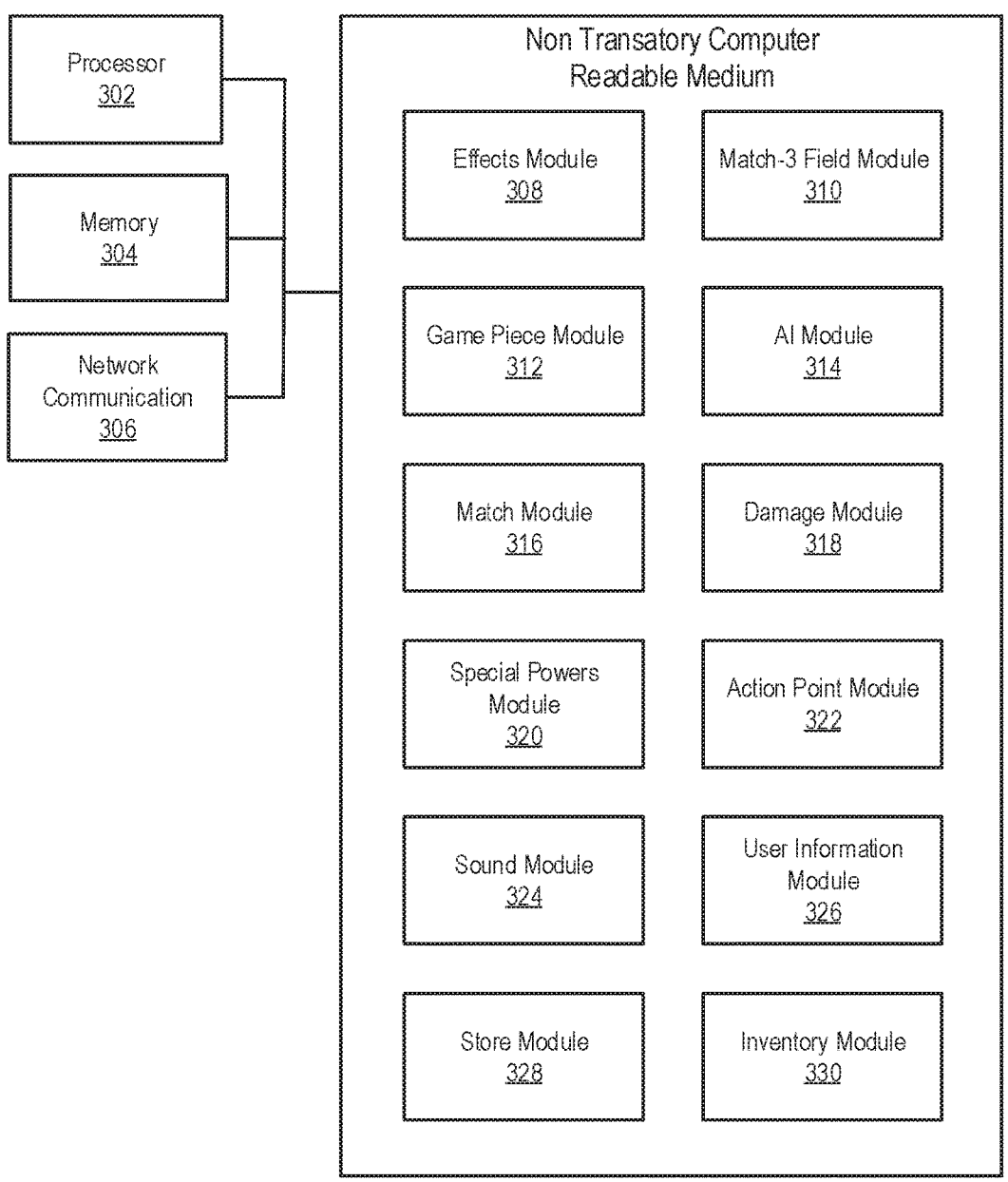
FIG. 3 is a block diagram of a computer system for implementing the various systems and methods for a match-3 strategic adventure game.

FIG. 3 is a block diagram of a computer system for implementing the various systems and methods for a match-3 strategic adventure game. As illustrated, the game may be implemented digitally via a processor 302, a memory 304, and optionally via a network communication 306. A non-transitory computer readable medium may include one or modules or sub-modules, where each module or sub-module is configured to perform one or more of the functions described in conjunction with the various embodiments described herein. Some of the modules described herein may have overlapping functions and represent alternatives and/or redundant systems. For example, the system may include an effects module 308 configured to determine what negative and/or positive effect a match will have on game pieces based on the matched icons, the player who made the match, and the characteristics of game pieces in corresponding rows/columns.

A match-3 module 310 may identify and/or define matches in the match-3 field. Alternatively and/or additionally, a match-3 module 310 may repopulate the match-3 icons as matches are made and removed from the match-3 field. A game piece module 312 may facilitate the types, characteristics, and/or placement of game pieces by game players. Game pieces may be characterized by powers, classes, features, skills, ranks, etc. Game pieces may interact with match-3 icons in varying ways. Thus, matches made with match icons in the match-3 field may have varying effects on the game pieces based on the characteristics of the would-be-effected game pieces. In some embodiments, the game pieces of an active player may affect what the effects of the match are on the inactive player(s) game pieces.

A match module 316 may control the match identification and/or the effects of matches made within the match-3 field. A special powers module 320 may determine what, if any, special powers the game pieces of the players may have and the effects the special powers may have based on matches identified by match module 316. A sound module 324 may determine the various sound effects and/or background music that should be played during gameplay. Store module 328 may allow game players to purchase upgrades or other features to improve or otherwise augment gameplay. A match-3 field module may control the match-3 functionality and allow players to move/switch icons in order to form matches of three or more icons. In some embodiments, matches may be non-traditional in that they may include matches of two or more icons in some situations, diagonal matches, or even other shapes (e.g., L shapes, number shapes, letter shapes, etc.).

An AI module 314 may control the gameplay of an AI player and may be regulated by one or more preconfigured gameplay strategies and may alter the gameplay based on a difficulty level setting. A damage module 318 may determine an amount of damage (or health/benefit/power) that a match will have on one or more of the game pieces of the inactive (or active) player(s). An action point module 322 may be configured to assign or award action points based on gameplay, strategic placement of game pieces, matches made, number of icons in a match, characteristics of the game pieces, and/or characteristics of the icons matched.

A user information module 326 may store and/or utilize user information to determine gameplay options, settings, allowed content, user specifications, and/or to facilitate online gameplay. An inventory module 330 may keep track of the abilities, action points, available game pieces, settings, etc. of a specific user.

Figure 4A:
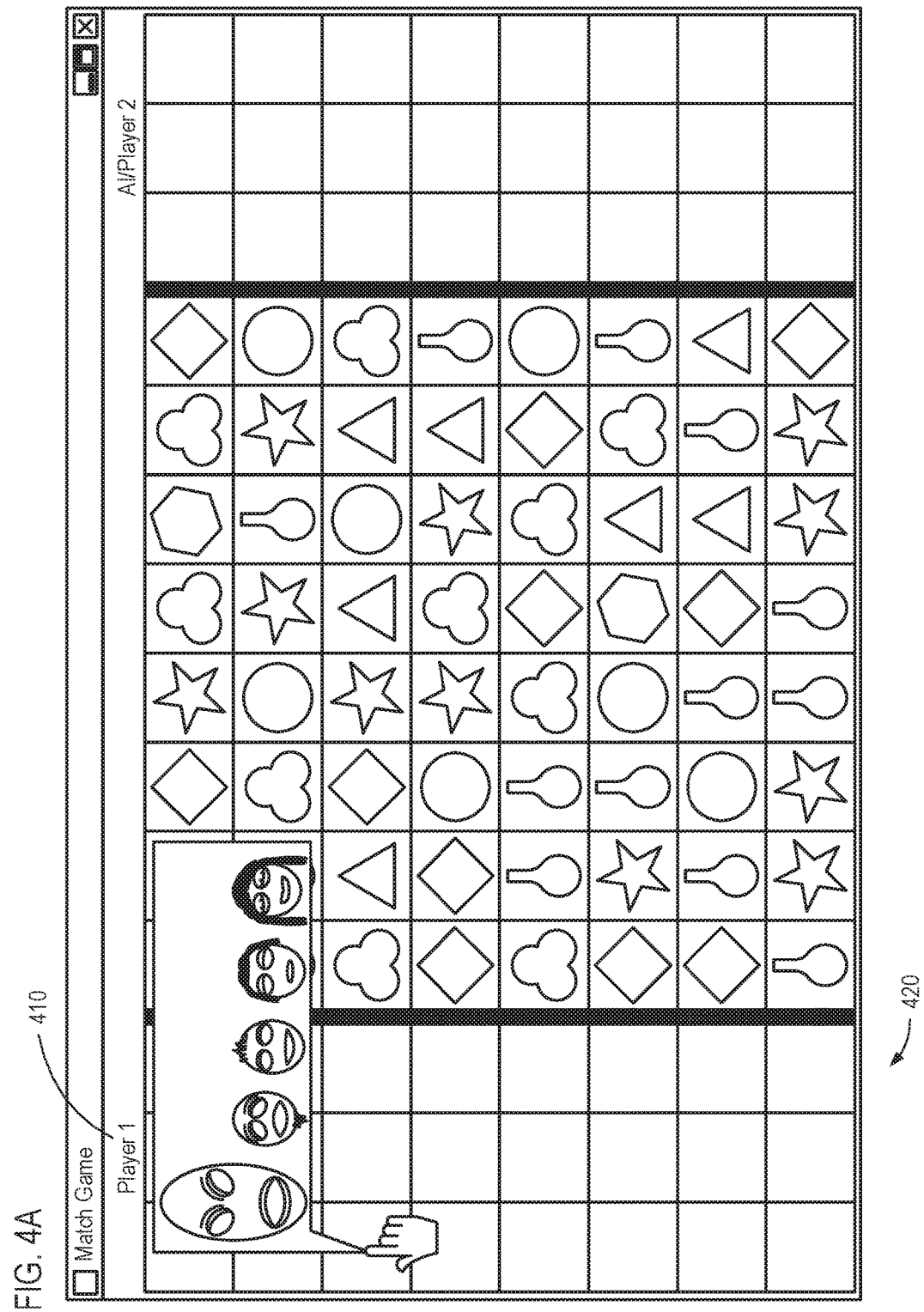
FIG. 4A illustrates a first player strategically placing one or more game pieces in a game-piece field.
Figure 4B:
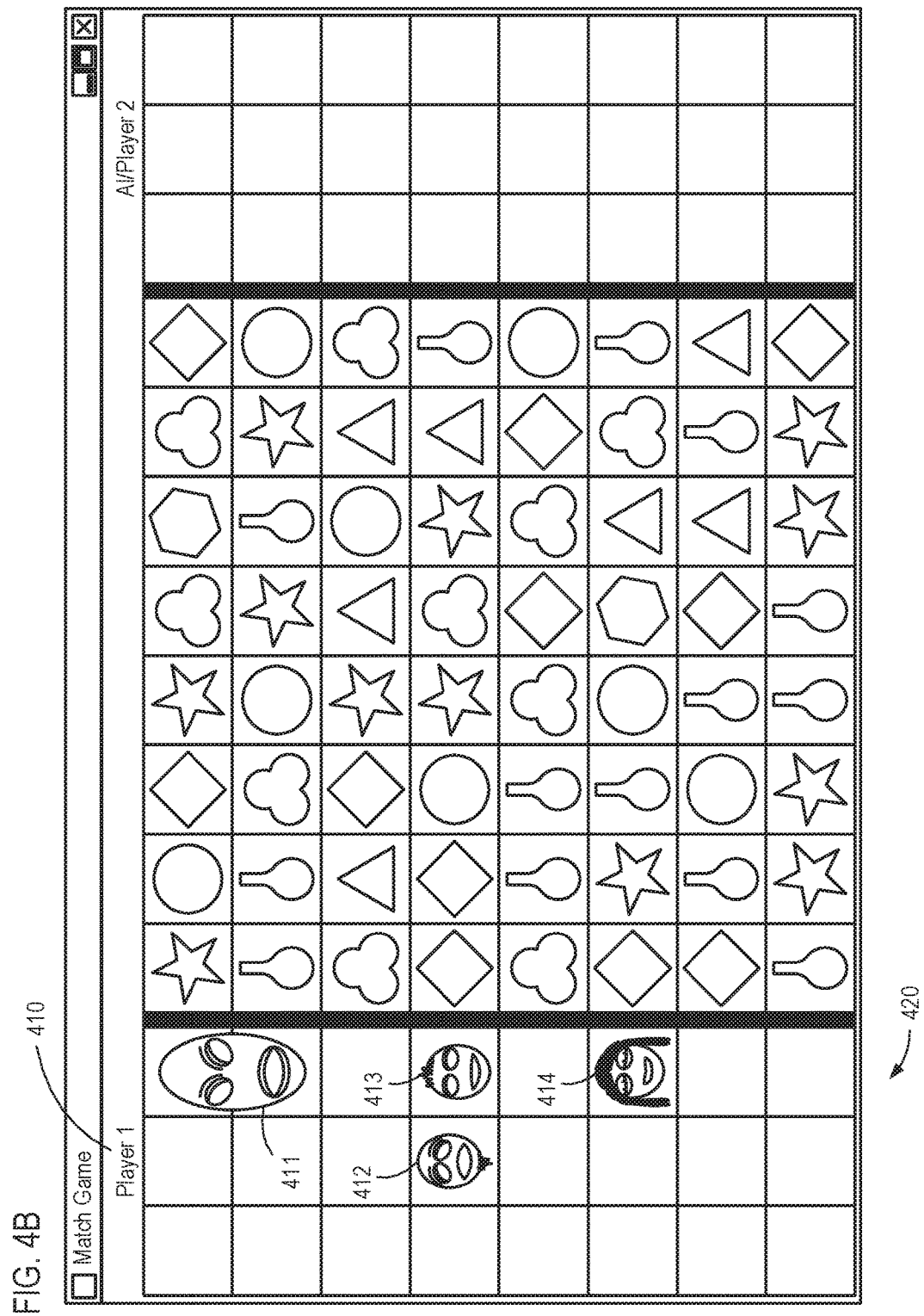
FIG. 4B illustrates the game pieces of a first player strategically placed in the game-piece field.
Figure 4C:
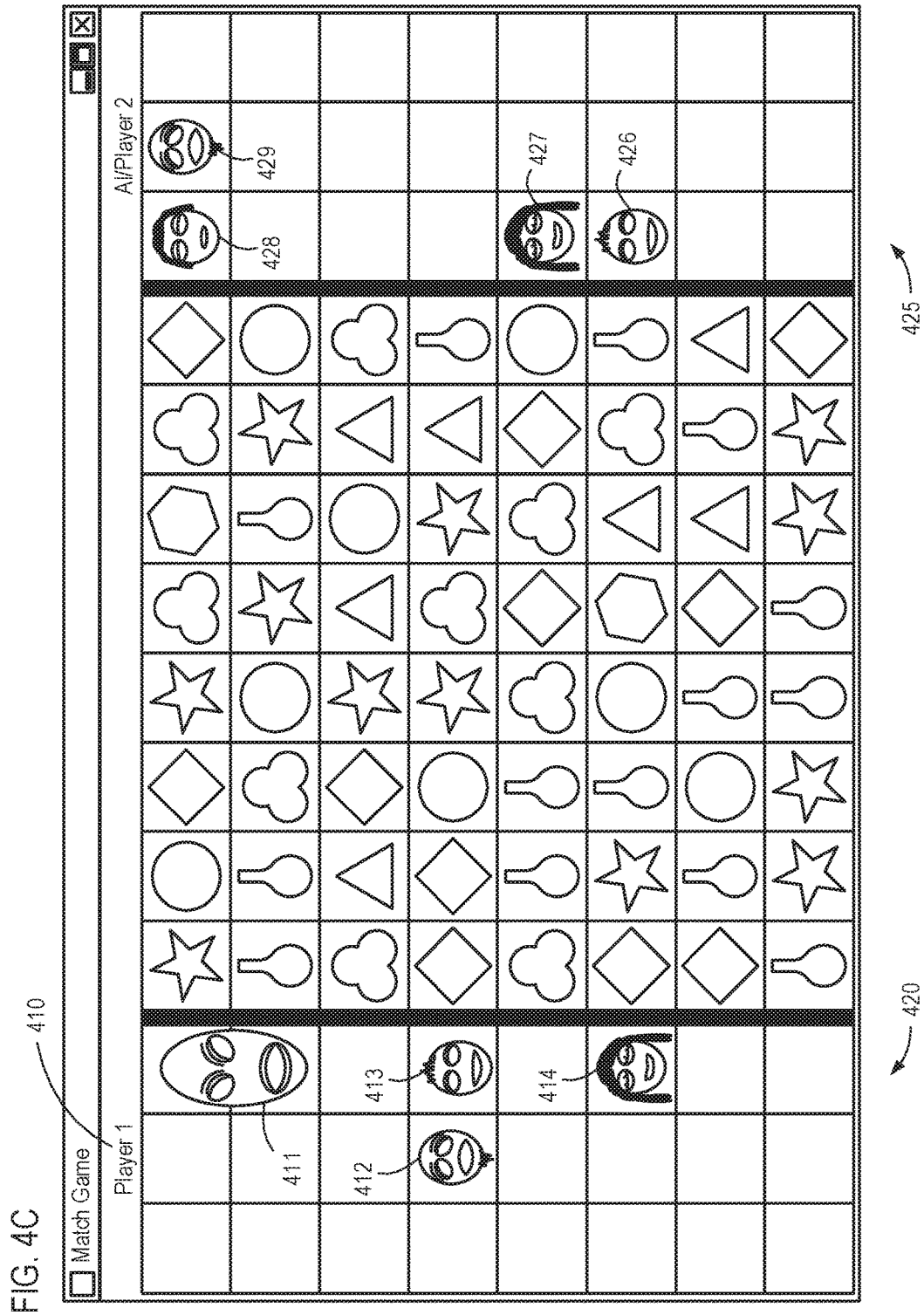
FIG. 4C illustrates first and second players with games pieces strategically placed in their respective game-piece fields.

FIGS. 4A-C illustrate a setup of a game according to one possible embodiment. In some embodiments, setup may be done automatically with default settings and default game piece placement.

FIG. 4A illustrates a first player 410 strategically placing one or more game pieces in a game-piece field 420. In the illustrated embodiment, player 1 selects a location in the player 1 game-piece field 420 to place a game piece from a selection of game pieces. Some of the game pieces may only require a single location within the game-piece field, while others may occupy more than one location. According to various embodiments, players may be limited to the number of game pieces they can play and/or the combination of types of game pieces or powers associated with game pieces.

FIG. 4B illustrates four game pieces 411-414 of player 1 strategically placed in the game-piece field 420 of player 1. As illustrated, one of the game pieces 411 spans two locations in the game-piece field 420. FIG. 4C illustrates first and second players with game pieces 411-414 and 426-429 strategically placed in their respective game-piece fields 420 and 425.

Figure 5A:
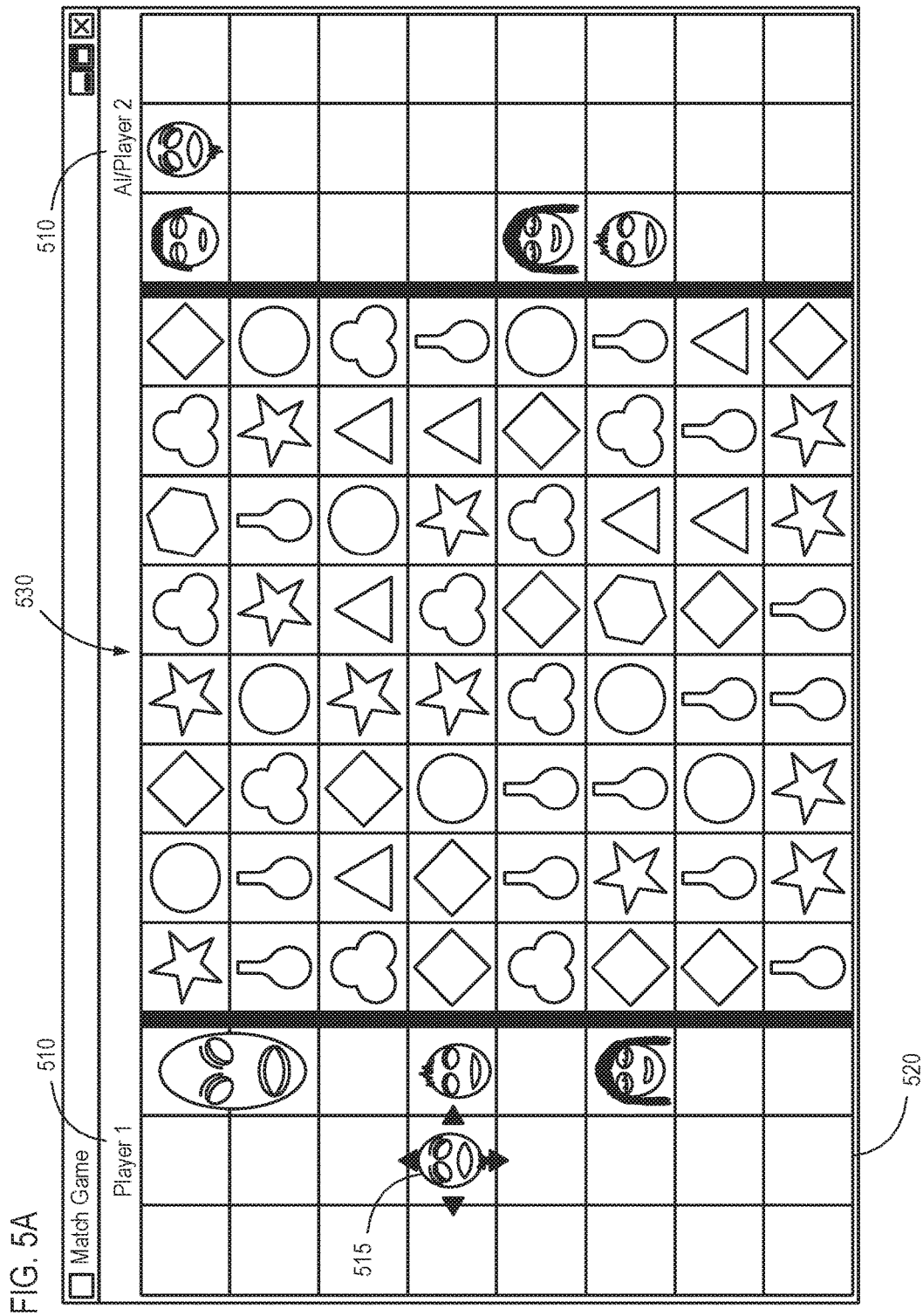
FIG. 5A illustrates a first player moving one or more game pieces within the game-piece field as part of a turn.

FIG. 5A illustrates a first player 510 moving a game piece 515 within the game-piece field 520 as part of a turn. Movement of one or more game pieces may be made only at the beginning of a turn, only after moving an icon in the match-3 field 530, only after the other player 540 moves a game piece, and/or a combination thereof depending on the game rules.

Figure 5B:
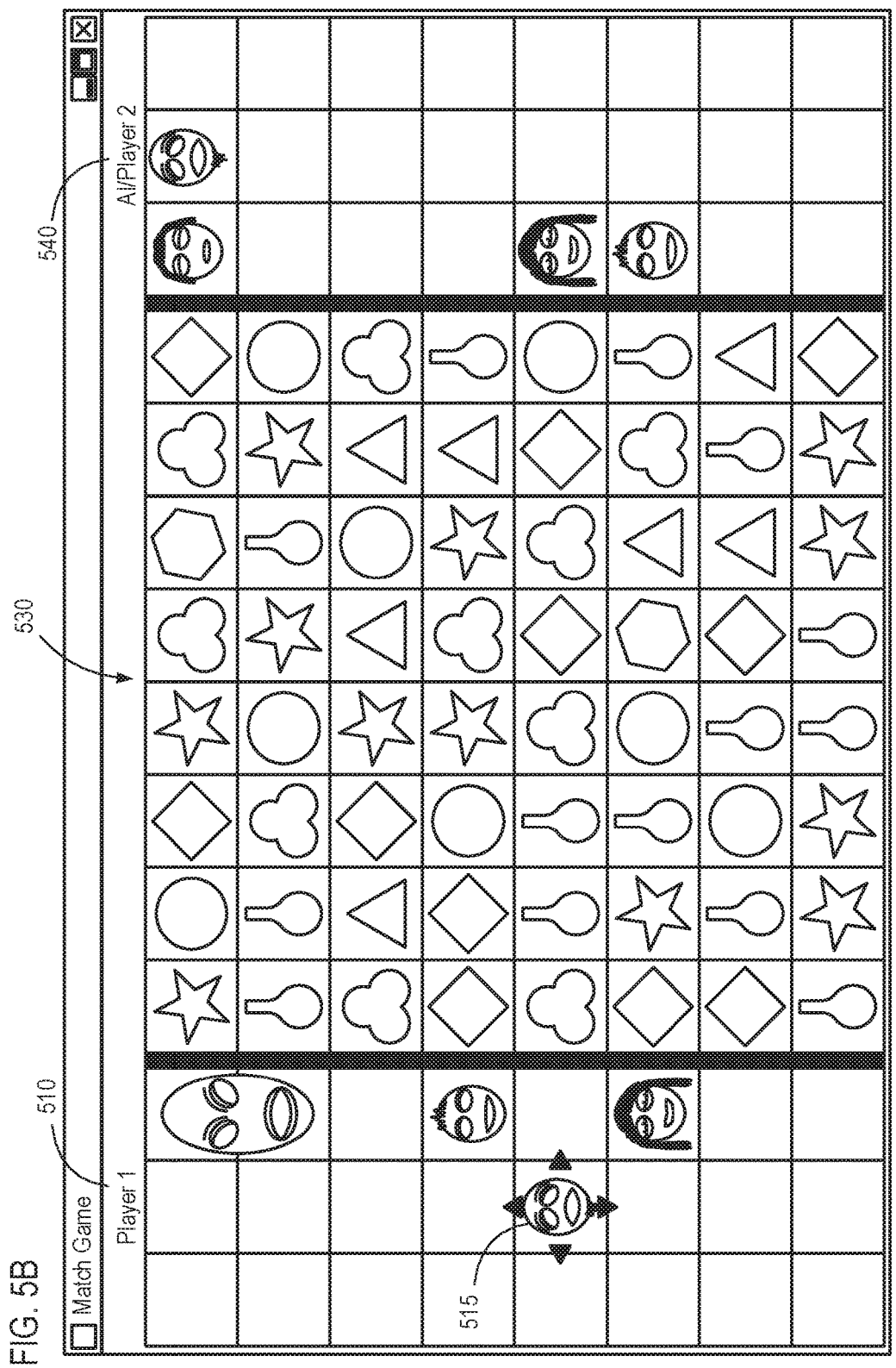
FIG. 5B illustrates a first player moving after moving one game piece within the game-piece field as part of a turn.
Figure 5C:
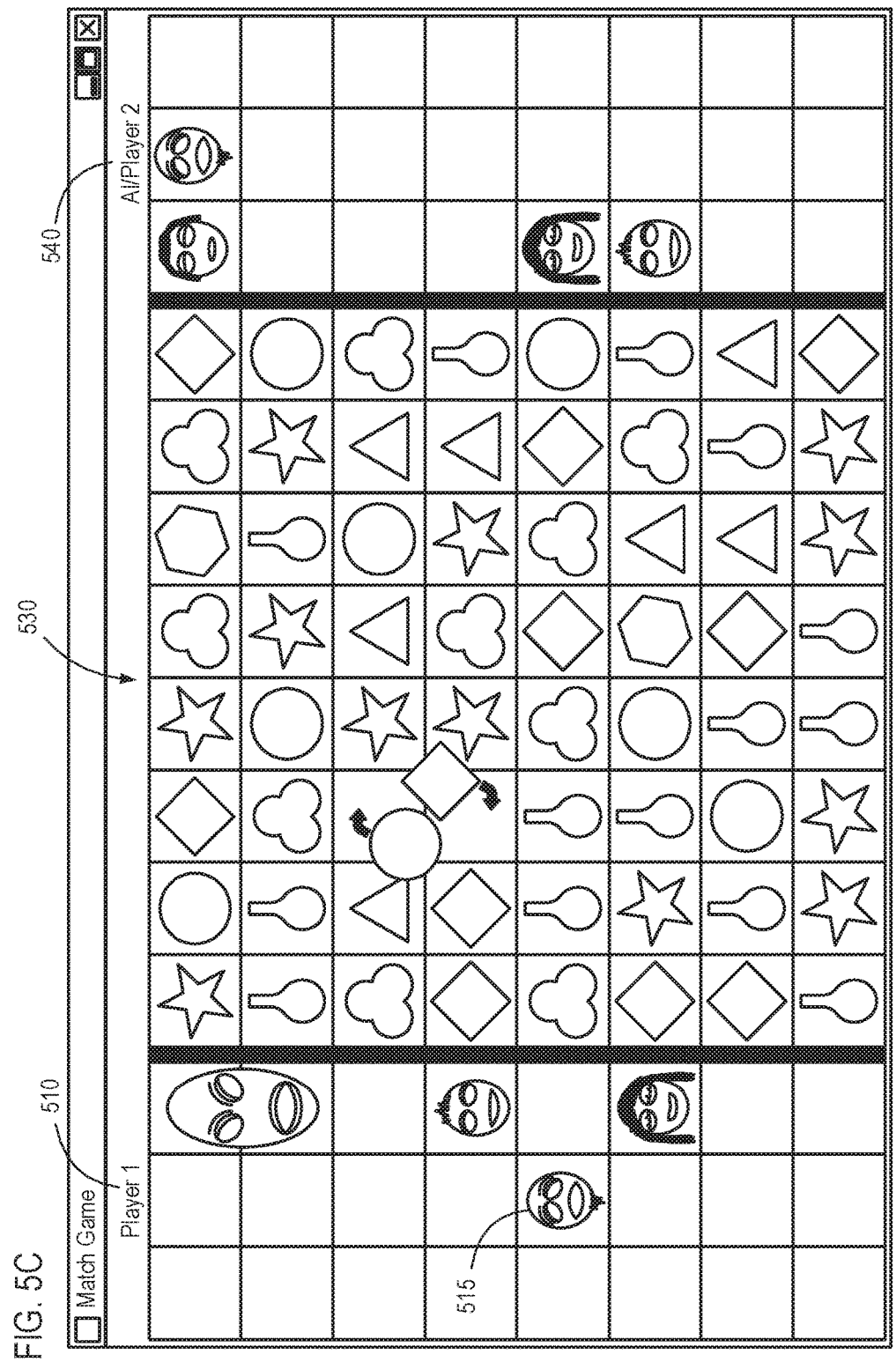
FIG. 5C illustrates a first player switching a circle icon with a diamond icon within the match-3 field to make a match of three diamond icons on the fourth row.

FIG. 5B illustrates a game piece moved from the fourth row to the fifth row of the game-piece field as part of a turn. FIG. 5C illustrates a first player switching a circle icon with a diamond icon within the match-3 field 530 to make a match of three diamond icons on the fourth row. Icons may be matches by shape, color, or any combination thereof. For example, a match may consist of aligning three diamond shaped icons of varying color. Alternatively, a match may consist of three heart shaped icons which are all the same color. Also, a match may consist of icons of dissimilar shape but comprising the same color.

Figure 5D:
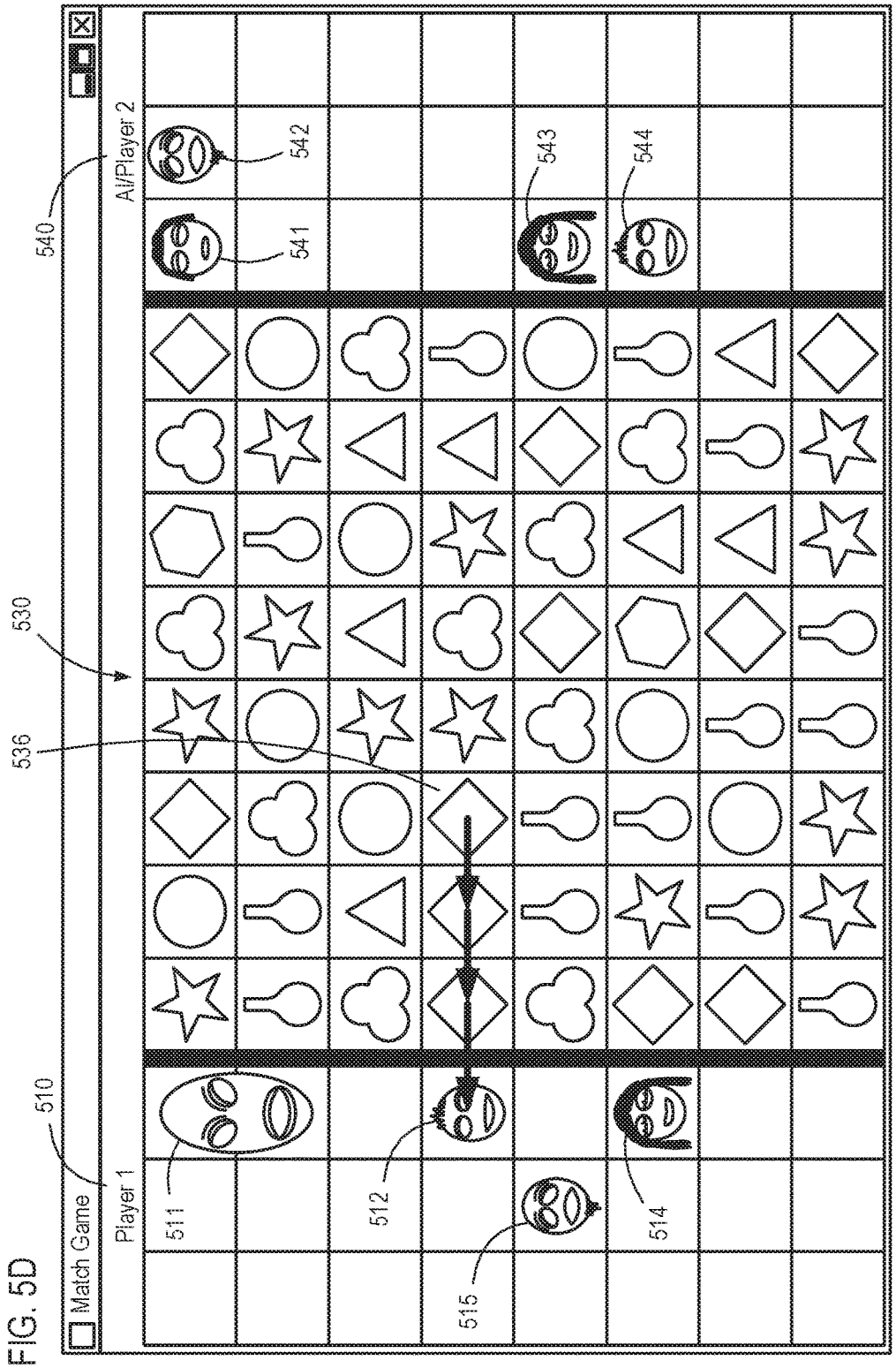
FIG. 5D illustrates a match of three diamond icons on the fourth row of the match-3 field made by player 1 having an effect on one of player 1's game pieces.

FIG. 5D illustrates a match 536 of three diamond icons on the fourth row of the match-3 field 530 made by player 1 510 having an effect on one of player 1's game piece 512. In various embodiments, when the effect of the match 536 is positive, it affects the game pieces 511, 512, 514, and 515 of the player 510 who made the match 536. If the effect of the match 536 is negative, it affects the game pieces 541-544 of the opponent 540 of the player 510 who made the match 536. In other embodiments, the effects of a match may be positive or negative and the match may affect any combination of the player who made the match and the opponent(s) of the player who made the match.

Figure 5E:
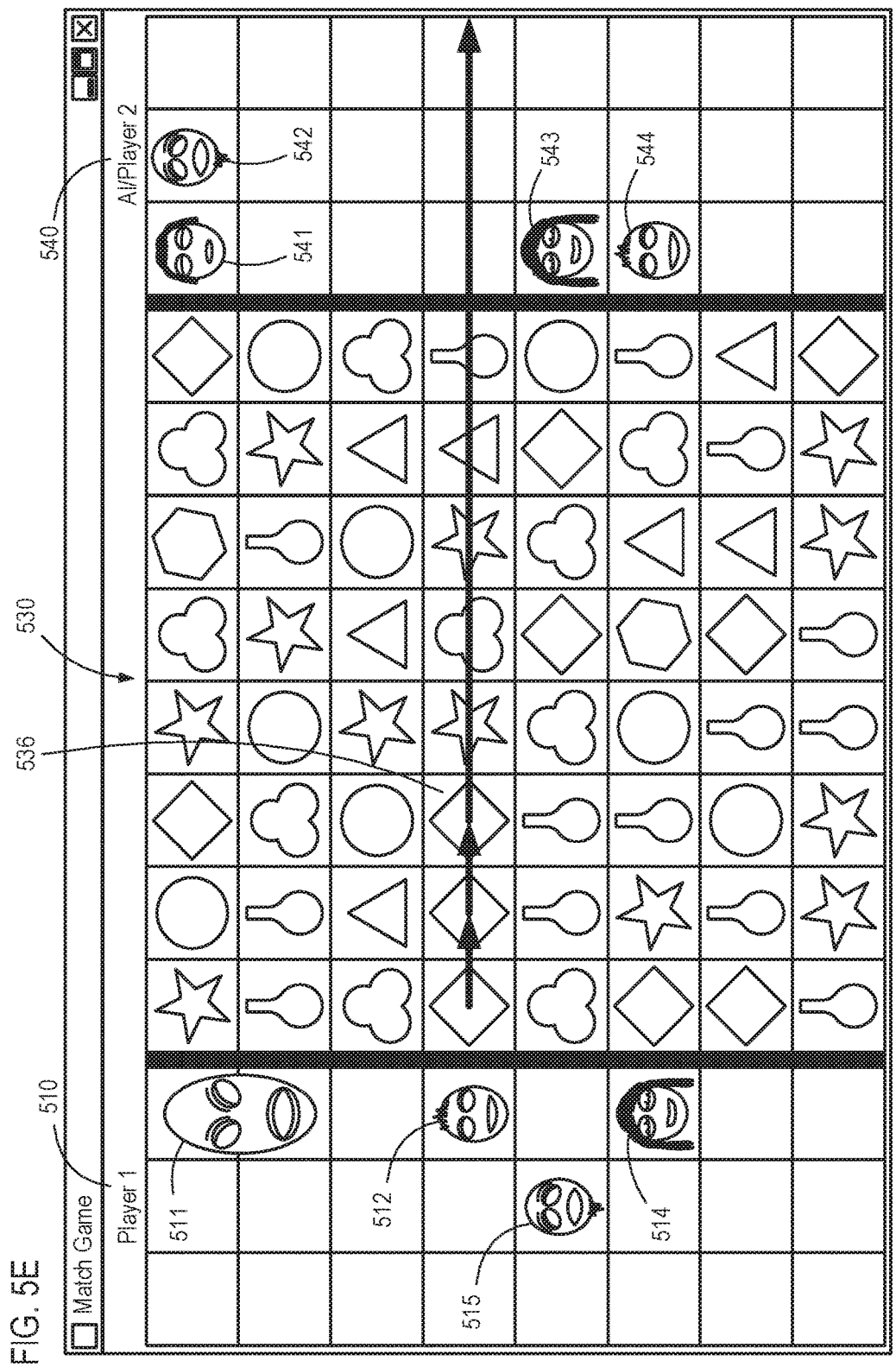
FIG. 5E illustrates an alternative in which the match of three diamond icons on the fourth row of the match-3 field made by player 1 would have an effect on AI/player 2's game pieces if a game piece were located in the fourth row.

FIG. 5E illustrates one such alternative in which the match of three diamond icons 536 on the fourth row of the match-3 field 530 made by player 1 510 would have an effect on AI/player 2's 540 game pieces 541-544 if a game piece were located in the fourth row. FIG. 5F illustrates the three matched diamonds disappearing and the icons above cascading down 537. In various embodiments, the new icons 537 provided to replace matched (removed) icons may cascade in from the top, slide in from the side, instantly appear, twinkle into place, and/or transition into place from any side, corner, front, back, etc. The transition into place may be done according to various "page" or "image" transitions known in the graphical arts for visual displays. In various embodiments new game pieces 537 may come in from the side of the active player (the player who caused the matched (and subsequently removed) icons.

Figure 5G:
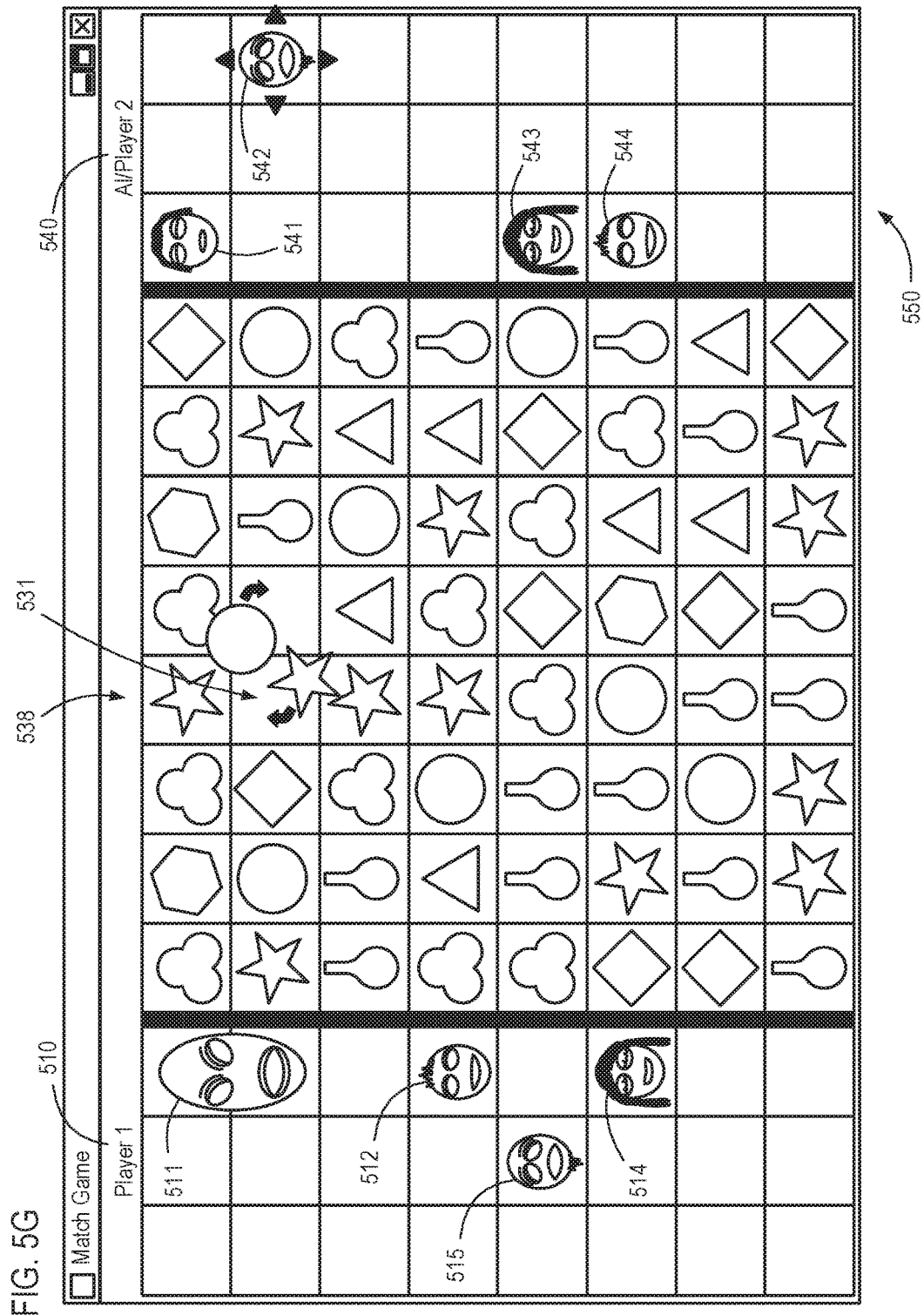
FIG. 5G illustrates AI/player 2 after having moved some game pieces within the player 2 game-piece field and switching a star icon and a circle icon on row two to make a match of four stars in the fourth column of the match-3 field.
Figure 5H:
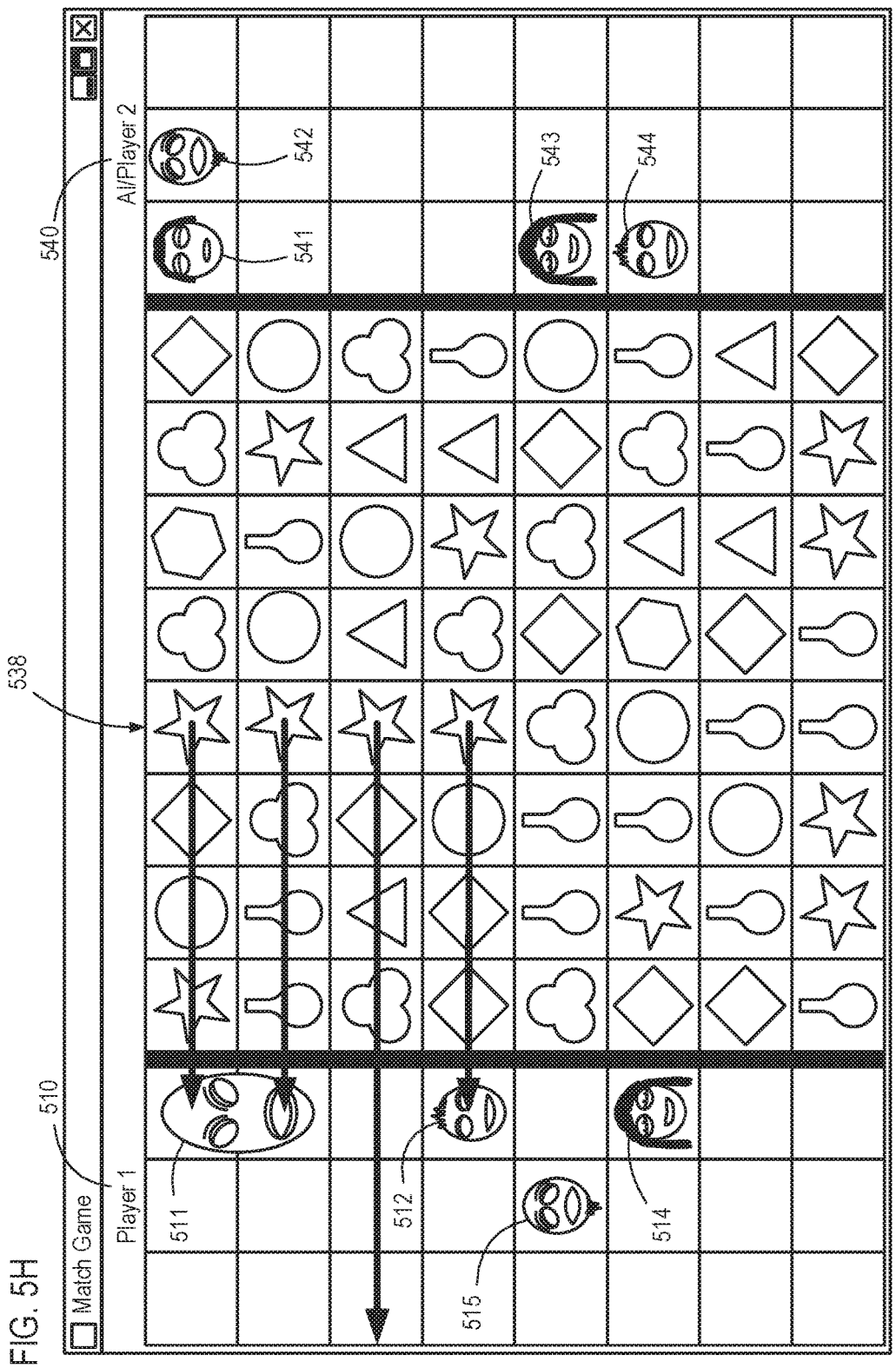
FIG. 5H illustrates AI/player 2 having made a match of four stars in the fourth column of the match-3 field and an associated effect on two of player 1's game pieces.
Figure 5I:
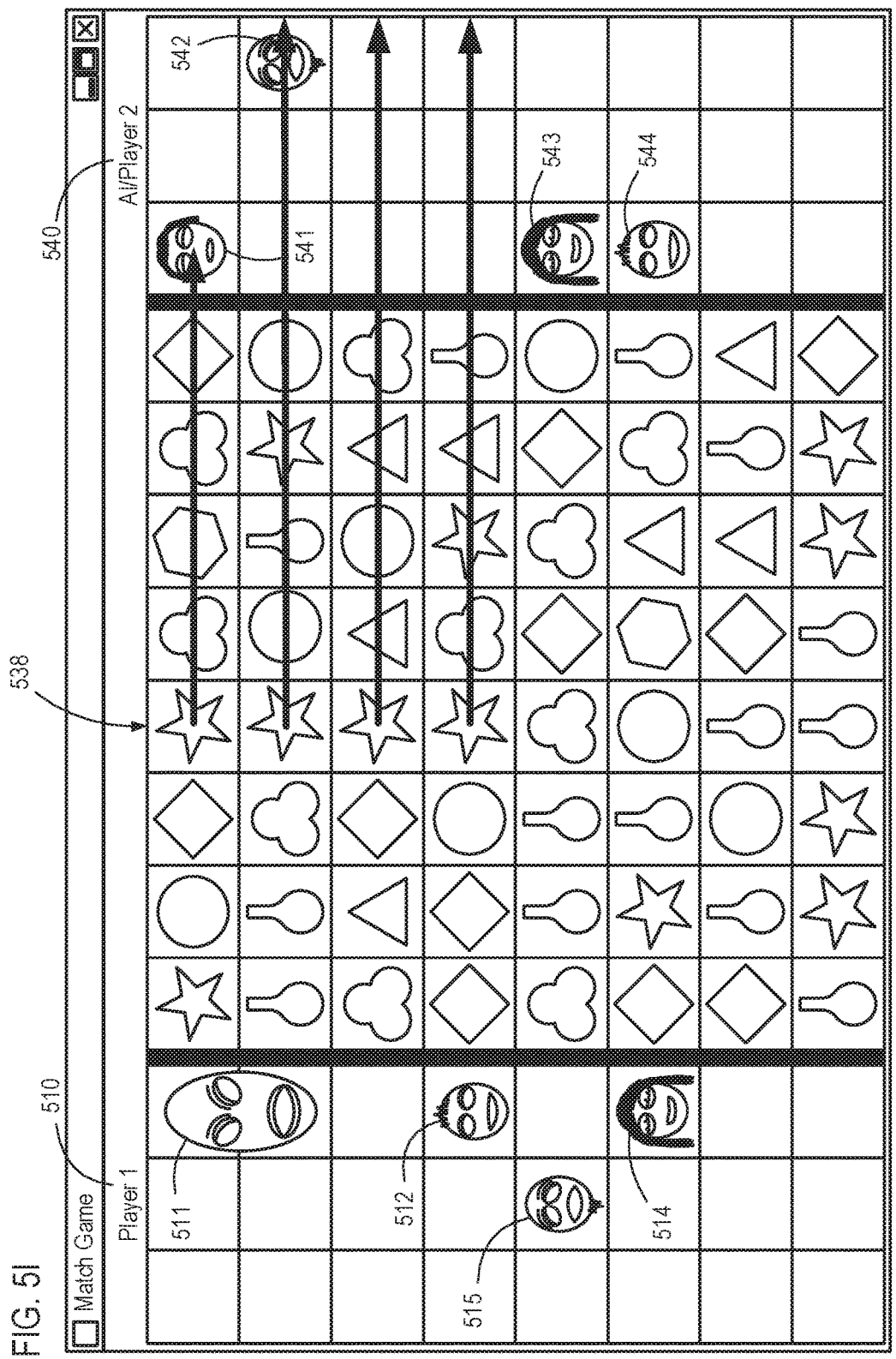
FIG. 5I illustrates an alternative in which the match of the four stars from FIG. 5H has an effect on player 2's own game pieces.

FIG. 5G illustrates AI/player 2 540 after having moved some game pieces 541-544 within the player 2 game-piece field 550 and switching 531 a star icon and a circle icon on the second row to make a match of four stars 538 in the fourth column of the match-3 field. FIG. 5H illustrates AI/player 2 540 having made a match of four stars 538 in the fourth column of the match-3 field 530 and an associated effect on two of player 1's game pieces 511 and 512. FIG. 5I illustrates an alternative in which the match of the four stars 538 from FIG. 5H has an effect on player 2's own game pieces 541 and 542.

Figure 5J:
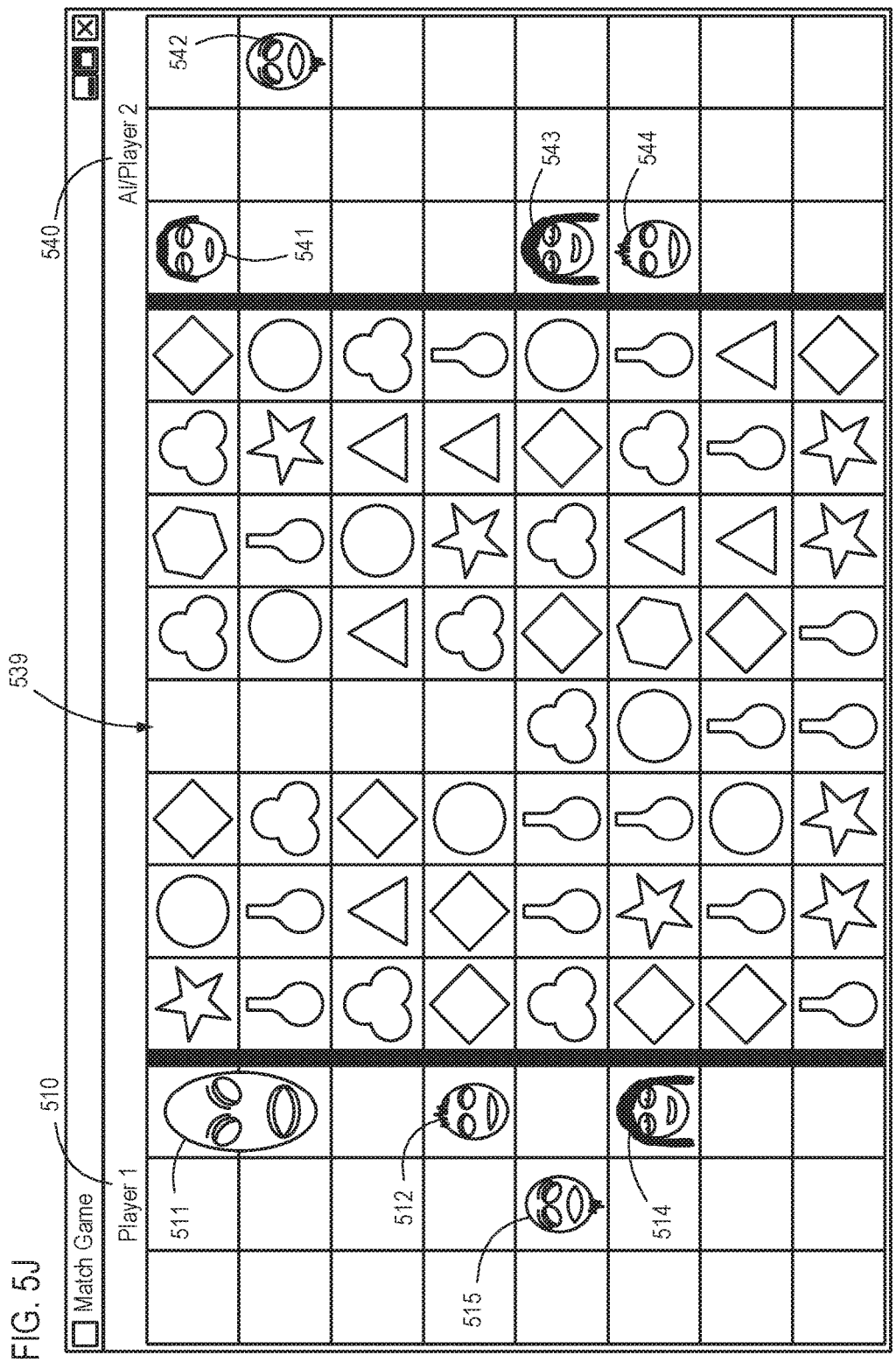
FIG. 5J illustrates the four stars removed from the match-3 field after having been matched.
Figure 5K:
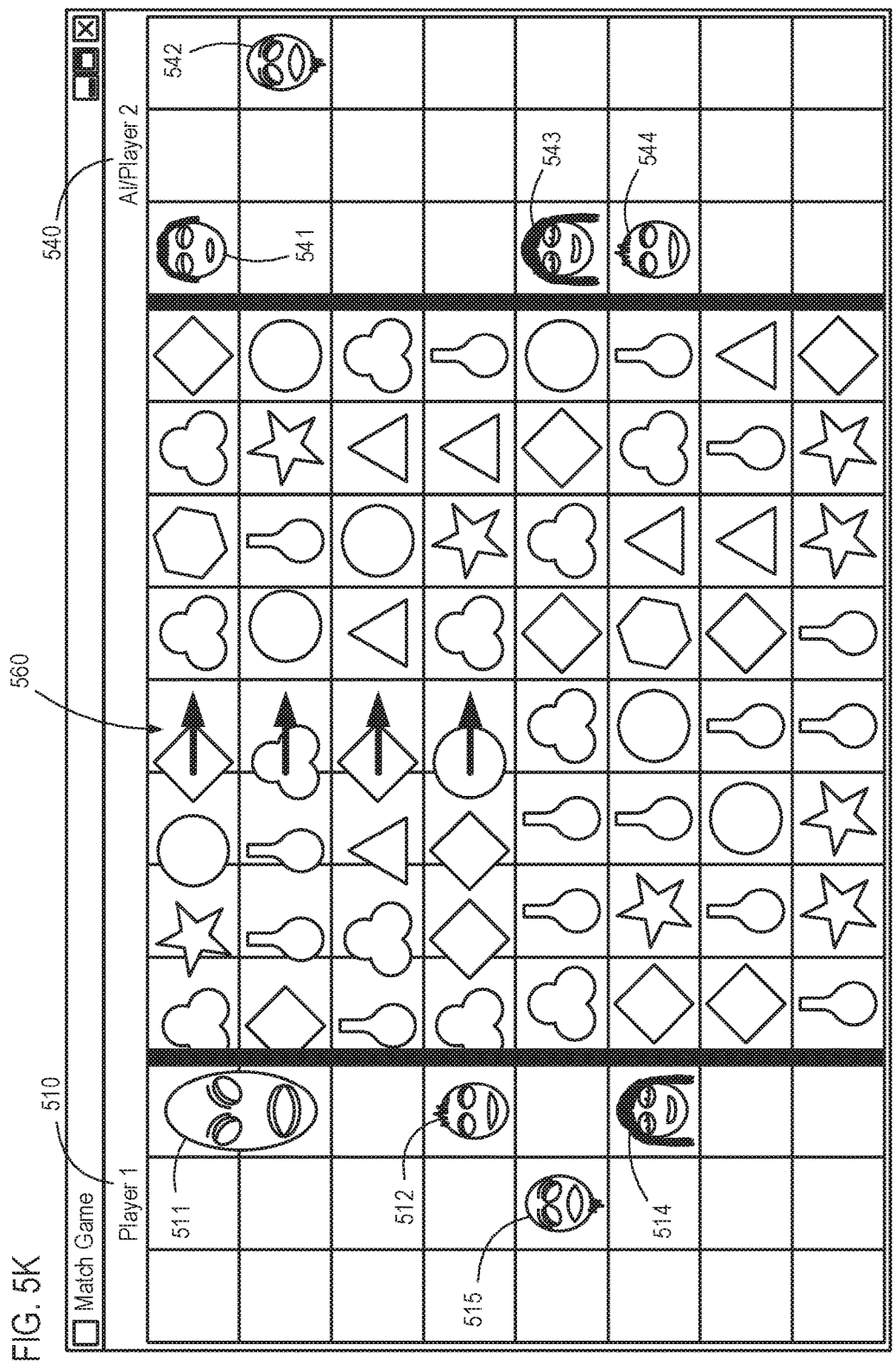
FIG. 5K illustrates icons cascading from the side to replace the matched stars.

FIG. 5J illustrates the four stars 538 removed from the match-3 field 530 after having been matched. As previously describe, new icons may be provided to replace matched (removed) icons from a physical pile or cache of icons (in a physical version). In virtual versions especially, the new icons may cascade in from the top, slide in from the side, instantly appear, twinkle into place, and/or transition into place from any side, corner, front, back, etc. FIG. 5K illustrates icons cascading from the side to replace the now-removed matched stars 539.

Figure 6A:
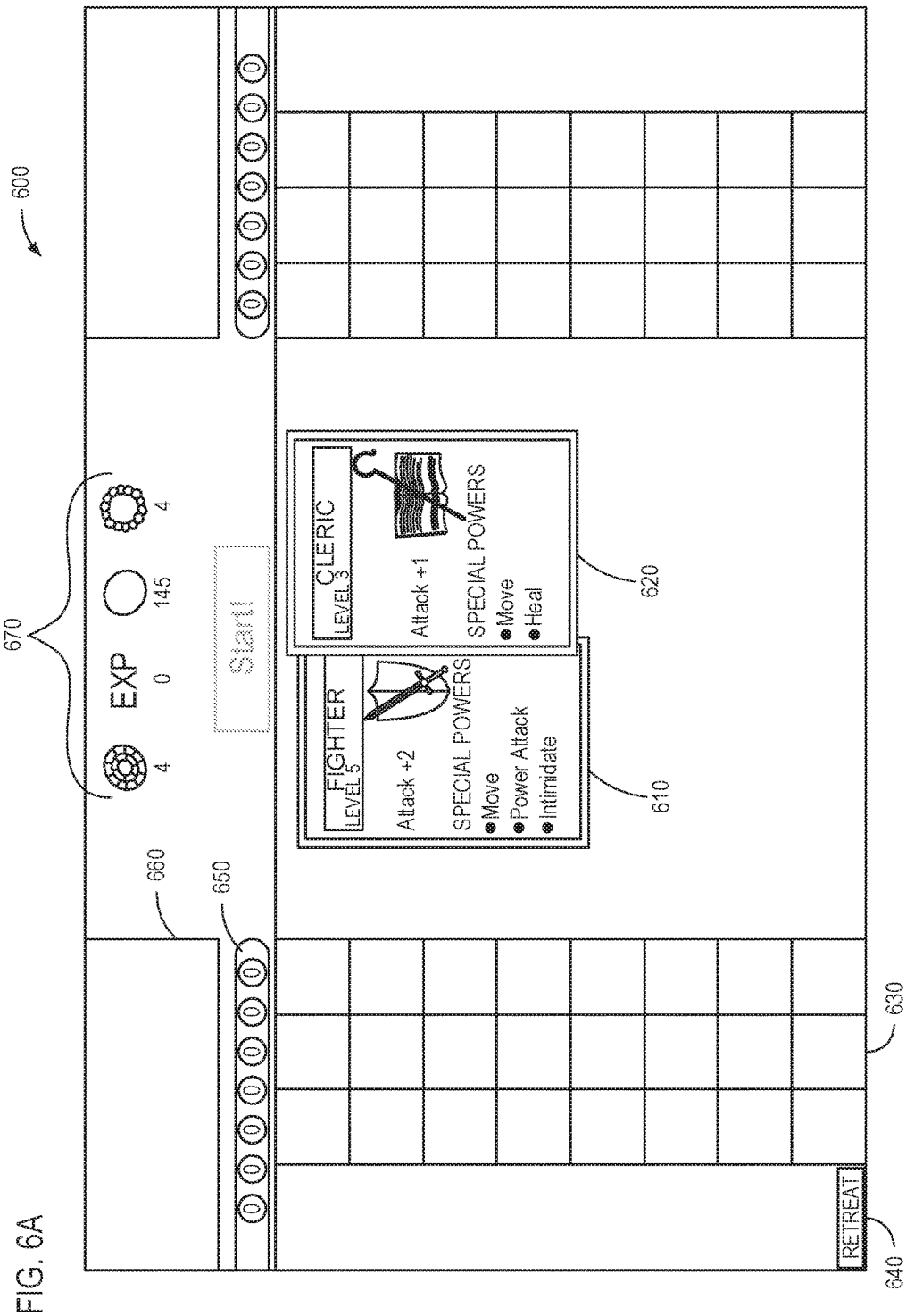
FIG. 6A illustrates a character placement phase of the game in which player 1 can place a fighter character and a cleric character, according to one embodiment.

FIG. 6A illustrates a character placement phase 600 of the game in which player can place a fighter character 610 and a cleric character 620, according to one embodiment. The characters can be placed within the game-piece filed 630. A retreat button 640 may allow the player to forfeit the game or otherwise quit or pause the game. Tally icons 650 may show the total number of matched icons of a particular color, shape, size, haptic feedback characteristic, or the like. As no matches have been made prior to the initial placement phase, the tallies are all at zero. Character information may be displayed within the character information window 660 once a character is selected. Totals for other information, such as coins, gems, money, EXP, etc. may be displayed in the top center 670. These totals may accumulate and be persistently associated with a player even after a particular match is one or lost.

Figure 6B:
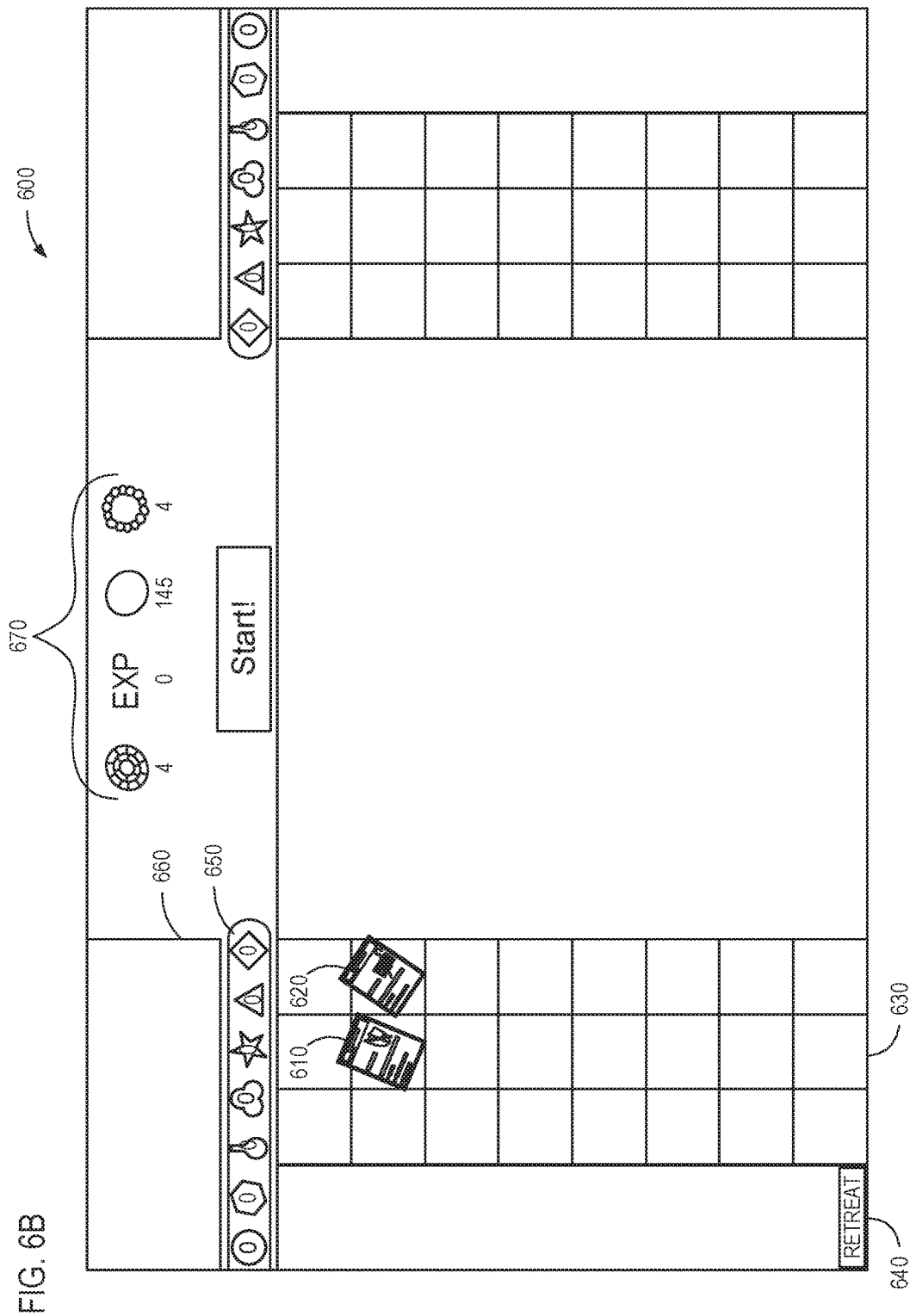
FIG. 6B illustrates the characters having been placed in player 1's game-piece field.
Figure 6C:
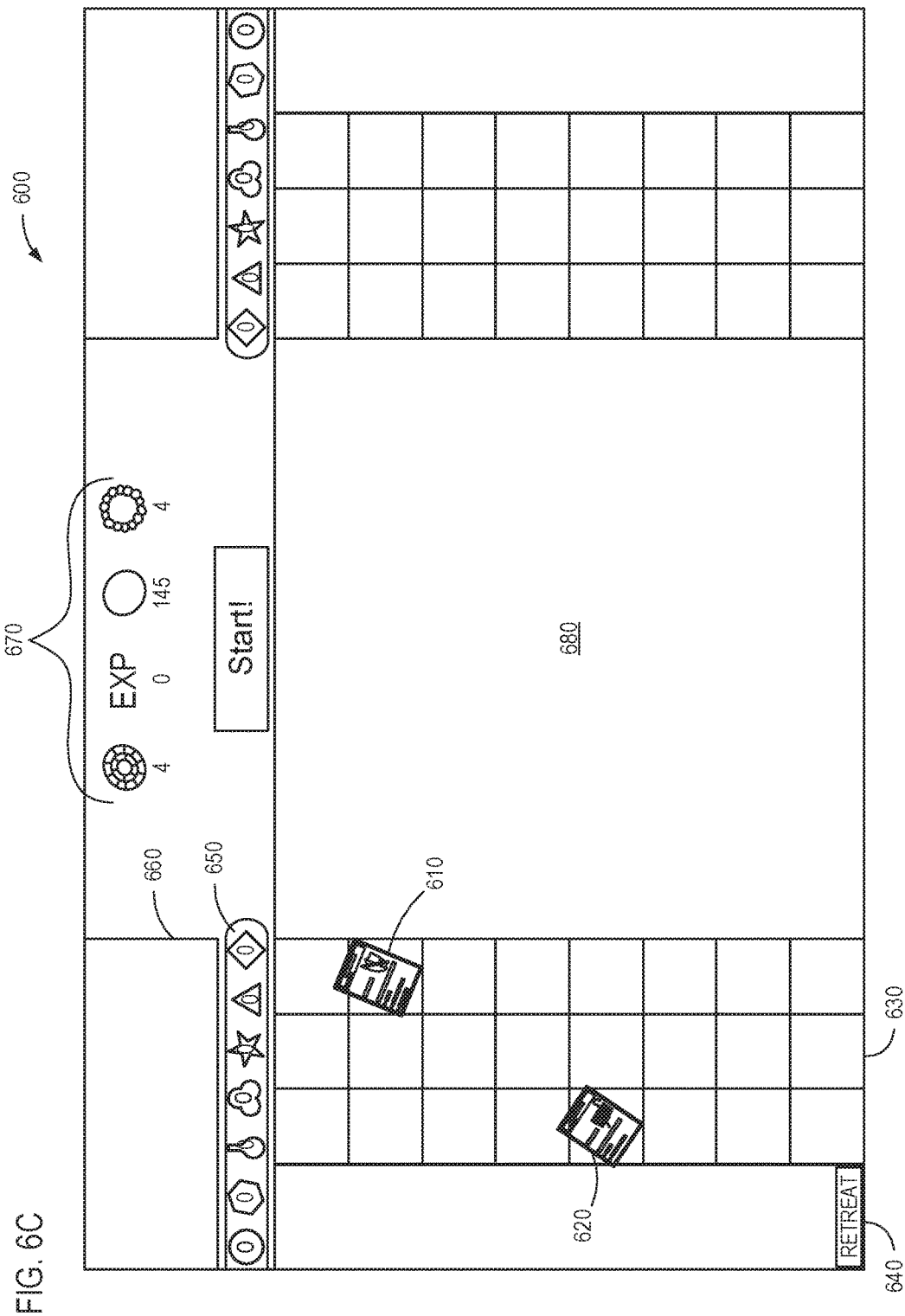
FIG. 6C illustrates the characters having been placed in alternative locations within player 1's game-piece field.

FIG. 6B illustrates the characters 610 and 620 having been placed in player 1's game-piece field 630. FIG. 6C illustrates the characters 610 and 620 having been placed in alternative locations within player 1's game-piece field. The illustrated game-piece field 630 is shown as including three columns and a number of rows equal to that of the match-3 field 680; however, any number of columns may be used in the game-piece field 630 (e.g., 1, 2, 3, 4, . . . ), and the number of rows in the game-piece field 630 may not be equal to that of the match-3 field 680. For example, the game-piece field 630 may include only six rows while the match-3 field 680 may include 8 rows, forcing the game-pieces 610 and 620 to not be placed on, for example, the edge rows (i.e., the first and last rows of the match-3 field 680).

The match-3 field 680 may include any number of rows and columns; however, for practical reasons in making matches of at least three icons, the number of rows and columns are each ideally larger than 4. Examples may include square layouts and rectangular layouts of between 5 and 10 rows and columns. Larger layouts are possible as well.

Figure 6D:
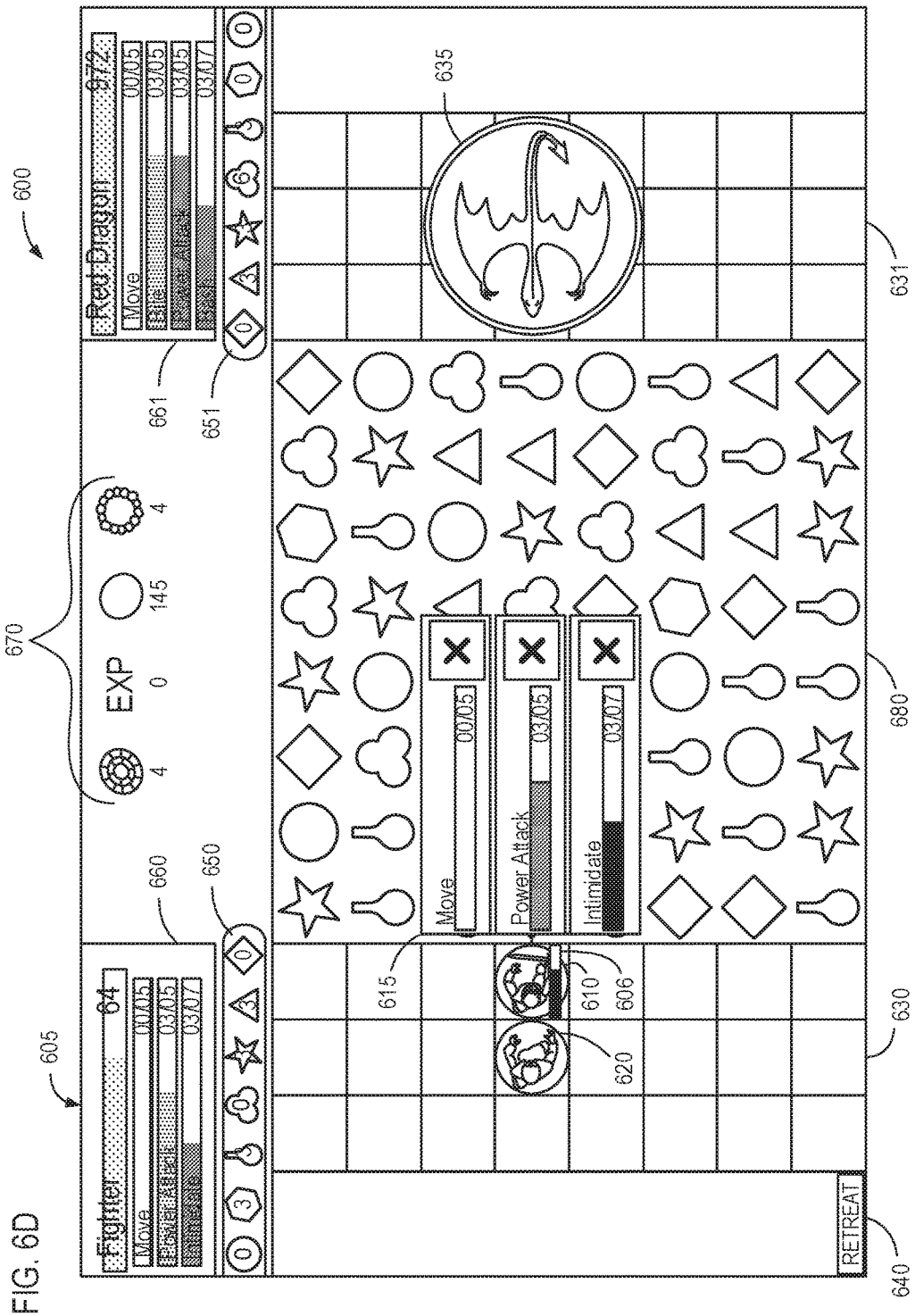
FIG. 6D illustrates player 1 battling a dragon, including an illustration of power bars according to one embodiment.

FIG. 6D illustrates player 1 605 battling a dragon 635, including an illustration of power bars 615 according to one embodiment. As illustrated, a first player character information window 660 may provide health 605 and other information about the selected fighter 610. The second player character information window 661 may display health and other information about the selected dragon 635. Match history tallies for each player may be displayed via tally icons 650 and 651.

The power bars 615 may relate to special functions associated with each particular type of character 610 or 620. As illustrated, the power bars 615 may show that the "move" function is empty due to a lack of a particular type of icon being previously matched and/or a move function having already been performed. A "power attack" function may be nearly ready. In one example, each time red icons are matched, the power attack power bar 615 fills up. Similarly, an "intimidate" function may not yet be ready due to a lack of a sufficient number of icons being matched that are associated with the intimidate function. The fighter 610 may also include a health bar 606 displaying the current health of the fighter as it is attacked and/or when it is selected.

Figure 6E:
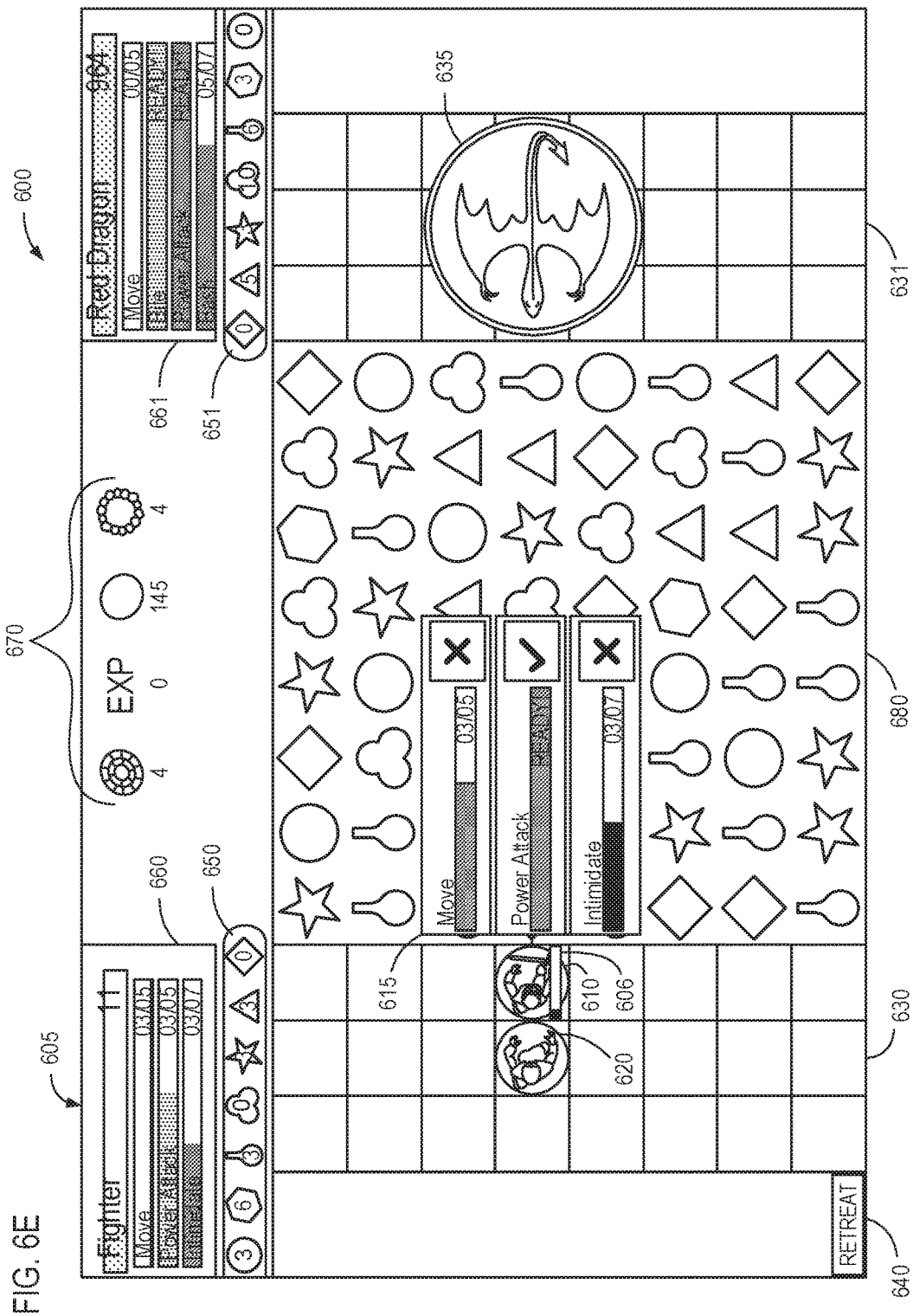
FIG. 6E illustrates a power attack power bar filled and available for use, according to one embodiment.

FIG. 6E illustrates a "power attack" within the power bars 615 filled and available for use, according to one embodiment. As illustrated in the example embodiment, the tally icon 650 for the hexagons has increased from 3 to 6

(compare FIG. 6D and FIG. 6E). In the illustrated embodiment, matched hexagons are associated with the power attack function of the fighter 610. As illustrated, while increasing the power attack function 615, the health 605 and 606 of the fighter 610 has decreased.

Figure 7A:
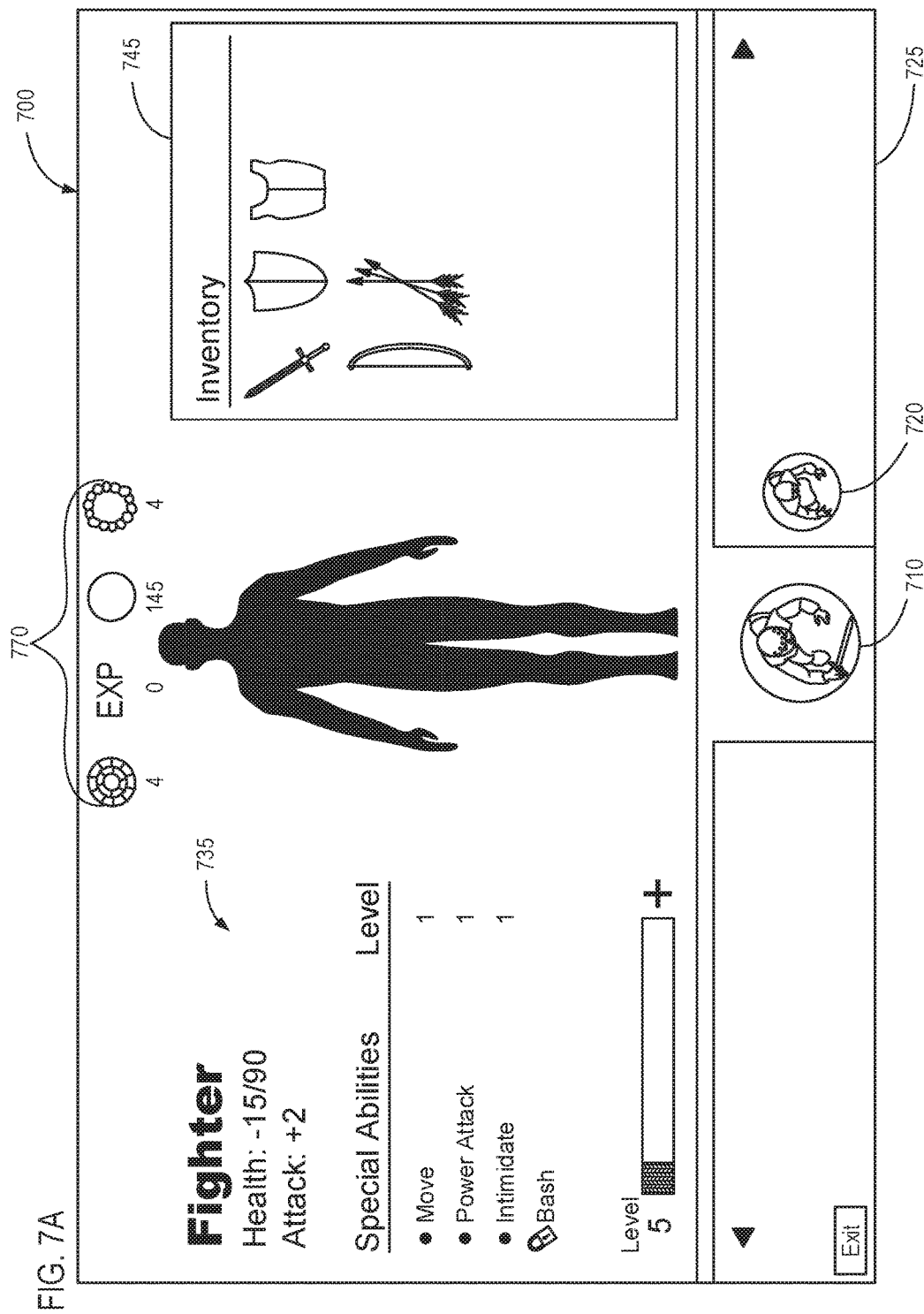
FIG. 7A illustrates a character view that enables a player to upgrade various attributes of a selected character, according to various embodiments.

FIG. 7A illustrates a character view 700 that enables a player to upgrade various attributes of a selected character 710, according to various embodiments. As illustrated, other available characters 720 may be selected in a character selection region 725. Information about the selected character may be displayed in a character information region 735. A character's inventory may be displayed, selectable, and/or modified via a character inventory region 745. Player-persistent totals for other information, such as coins, gems, money, EXP, etc. may be displayed in the top center 770. In various embodiments, money (or coins, gems, EXP, etc.) (earned virtually, corresponding to actual in-game purchases, or accomplishments) may be spent or exchanged by the player to upgrade the selected character 710, augment or modify the inventory 745, and/or upgrade, refill, or replenish other attributes 735.

FIG. 7B illustrates the character view after a player has upgraded or refilled various attributes 735 in exchange for money 770, according to various embodiments.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

What is claimed is:

1. A non-transitory computer-readable medium storing instructions that, when executed by a processor, cause the processor to:
   cause a display device to display a first game-piece field;
   enable a user to strategically position at least one game piece character within the first game-piece field;
   cause the display device to display a match-3 field with icons, the icons including a first icon and a second icon;
   enable the user to move the icons to form matches of three or more of the icons;
   during a movement phase of gameplay, enable the user to move at least one of the game piece characters within the first game-piece field to a position having a strategic advantage;
   during a matching phase of gameplay, enable the user to form a match of three or more icons by enabling the user to swap a first position of the first icon with a second position of the second icon;
   identifying an effect from a plurality of effects, the effect being associated with a match of three or more icons along at least one of a row or column of the match-3 field;
   applying the identified effect to at least one of game piece character of an opponent of the user, the at least one game piece character of the opponent being positioned with a row in which at least one of the matched icons is positioned, wherein applying the identified effect comprises decreasing a health status of the at least one game piece character of the opponent; and
   in response to determining that: (a) a game piece character of the user is positioned within the same row as the game piece character of the opponent being affected; and (b) the game piece character of the opponent being affected is also within the same row in which at least one of the matched icons is positioned, amplifying the effect of decreasing the health status of the at least one game piece character of the opponent.

2. The non-transitory computer-readable medium of claim 1, further comprising instructions which when executed by the processor, cause the processor to:
   cause the display device to display the match-3 field with an array of cells with at least five columns and at least five rows; and
   position the icons with the cells such that 25 icons are positioned within the match-3 field.

3. The non-transitory computer-readable medium of claim 2, further comprising instructions which when executed by the processor, cause the processor to:
   cause the display device to display the first game-piece field with an array of cells with at least one column and a number of rows equal to the number of rows of the match-3 field; and
   cause the display device to display a second game-piece field of the opponent with an array of cells with at least one column and a number of rows equal to the number of rows of the match-3 field.

4. The non-transitory computer-readable medium of claim 3, further comprising instructions which when executed by the processor, cause the processor to enable the opponent to position at least one game piece character within the array of cells of the second game-piece field.

5. The non-transitory computer-readable medium of claim 1, further comprising instructions which when executed by the processor, cause the processor to:
   in response to a determination that swapping one icon with another icon will not form a match, prohibit said swapping, wherein said swapping is only allowed if the icons are adjacent to one another.

6. The non-transitory computer-readable medium of claim 1, wherein the icons are identical except for one variable characteristic, the one variable characteristic being one of: shape, color, and size; and further comprising instructions which when executed by the processor, cause the processor to form a match when one of the icons is swapped with another one of the icons to form a set of three icons in a row or column that all have the same characteristic.

7. The non-transitory computer-readable medium of claim 1, wherein the icons are identical except for two variable characteristics, the first variable characteristic being one of: shape, color, and size, and the second variable characteristic being a haptic feedback characteristic; and further comprising instructions which when executed by the processor, cause the processor to form a match when one of the icons is swapped with another one of the icons to form a set of three icons in a row or column that all have the same two variable characteristics.

8. The non-transitory computer-readable medium of claim 1, further comprising instructions which when executed by the processor, cause the processor to only move the game piece characters of the user after a predetermined number of matches of a predetermined type of match have been completed by the user.

9. The non-transitory computer-readable medium of claim 1, further comprising instructions which when executed by the processor, cause the processor to enable the user to strategically position one or more of the game piece characters based on the special functions of each of the game piece characters.

10. The non-transitory computer-readable medium of claim 1, further comprising instructions which when executed by the processor, cause the processor to:
    after the identified effect has been applied, remove a plurality of the icons from the match-3 field that form a match of three or more icons;
    cascade the icons within the same row as the removed icons such that locations in the match-3 field devoid of icons are on either the first column or the last column; and
    replenish the locations in the match-3 field that are devoid of icons with randomly selected icons.

11. The non-transitory computer-readable medium of claim 1, further comprising instructions which when executed by the processor, cause the processor to decrease a health status of the game piece character of the user by an amount corresponding to the number of matched icons positioned within the same row as the game piece character of the opponent being affected.

12. The non-transitory computer-readable medium of claim 1, further comprising instructions which when executed by the processor, cause the processor to apply a second identified effect to the at least one game piece character of the user positioned within a row in which at least one of the matched icons is positioned, and wherein the second identified effect comprises increasing a health status of the at least one game piece character of the user.

13. The non-transitory computer-readable medium of claim 1, further comprising instructions which when executed by the processor, cause the processor to a second identified effect to the at least one game piece character of the user positioned within a row in which at least one of the matched icons is positioned, and wherein the second identified effect comprises making available a special function of the at least one game piece character of the user.

14. The non-transitory computer-readable medium of claim 13, further comprising instructions which when executed by the processor, cause the processor to during a special function phase of gameplay, enable the user to implement a special function previously made available based previously matched icons.

15. The non-transitory computer-readable medium of claim 14, wherein the movement phase of gameplay during with the user can move is only available as part of the special function of gameplay.

* * * * *